United States Patent
Sato

[11] Patent Number: 6,104,109
[45] Date of Patent: *Aug. 15, 2000

[54] YOKE MANUFACTURING METHOD, STATOR MANUFACTURING METHOD, AND MOTOR

[75] Inventor: Toshihiro Sato, Toyohashi, Japan

[73] Assignee: ASMO Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/080,950

[22] Filed: May 19, 1998

[30] Foreign Application Priority Data

May 30, 1997 [JP] Japan .................................. 9-142773

[51] Int. Cl.⁷ .................................................. H02K 33/10
[52] U.S. Cl. ..................................... 310/40 MM; 310/154
[58] Field of Search .................................. 310/40 M, 154, 310/159, 177; 417/360, 423.14, 423.15

[56] References Cited

U.S. PATENT DOCUMENTS

| | | | |
|---|---|---|---|
| 3,445,692 | 5/1969 | Kato | 310/42 |
| 4,309,815 | 1/1982 | Schmitt et al. | 310/40 MM |
| 4,409,505 | 10/1983 | Petersen | 310/90 |
| 4,688,887 | 8/1987 | Mori | 385/73 |
| 5,160,867 | 11/1992 | Niemela | 310/154 |
| 5,175,460 | 12/1992 | Ishizuka | 310/154 |
| 5,191,250 | 3/1993 | Kobayashi | 310/261 |
| 5,243,245 | 9/1993 | Oba | 310/89 |
| 5,412,271 | 5/1995 | Mizuno et al. | 310/71 |
| 5,480,289 | 1/1996 | Lee | 417/360 |

FOREIGN PATENT DOCUMENTS

| | | | |
|---|---|---|---|
| 57-139252 | of 0000 | Japan . | |
| 355125068A | 9/1980 | Japan | H02K 23/04 |
| 3-34652 | 4/1991 | Japan . | |
| 06054497A | 2/1994 | Japan | H02K 23/04 |
| 7-56619 | 12/1995 | Japan . | |

*Primary Examiner*—Nestor Ramirez
*Assistant Examiner*—Joseph Waks
*Attorney, Agent, or Firm*—Parkhurst & Wendel, L.L.P.

[57] ABSTRACT

A base plate is formed by press processing by cutting out a bottom portion and a side wall portion connected integrally with the bottom portion, and a rotating-shaft insertion hole is formed thereon. The side wall portion is bent at a border portion where the side wall portion is connected to the bottom portion and is curved around the bottom portion, and further both end portions of the side wall portion in the transverse direction are connected to each other. As a result, a cylinder-shaped yoke is formed.

16 Claims, 19 Drawing Sheets

YOKE MANUFACTURING METHOD, STATOR MANUFACTURING METHOD, AND MOTOR

BACKGROUND OF THE INVENTION

1. Field of the Invention

The present invention relates to a motor used by electrical equipment, and a method for manufacturing the motor, and particularly an a motor suitable for an electrical equipment for vehicles or acoustical equipment, and a method for manufacturing the motor.

2. Description of the Related Art

Generally, a bottomed cylindrical yoke which is formed by deep drawing of a metal plate (i.e., a yoke which holds a magnet at an inner side thereof to form a magnetic circuit) is applied to a small-sized motor used by electrical equipment for vehicles, acoustic equipment, and the like.

However, in the deep drawing process, it is difficult for the wall thickness of an outer peripheral portion of the yoke to be made uniform, and therefore, it is difficult to obtain a satisfactory magnetic circuit. A yoke manufacturing method for solving the above drawback is disclosed in Japanese Utility Model Application Laid-Open (JP-U) No. 57-139252.

In this method, a yoke is formed in such a manner that a base plate is cut out by punching from a metal plate, the formed base plate is then rounded substantially circular in cross section, and facing peripheral end portions of the base plate are connected to each other so as to allow formation of a cylindrical body. End caps are fitted into axial-direction end portions of the cylindrical body. In addition, it is also mentioned that a yoke is formed in such a manner that two base plates which are each rounded substantially in a semi-circle in a cross section are caused to face each other, and the peripheral end portions of one of the base plates are connected to peripheral end portions of another base plate, respectively, to form a cylindrical body, and end caps are fitted into axial-direction end portions of the cylindrical body.

On the other hand, in the above-described yoke, a through hole is formed in one of the end caps fitted into the both end portions of the yoke in the axial direction and a motor rotating shaft passes through the through hole.

However, with the above-described yoke structure, the yoke and the end caps are formed separately, and therefore, there is a possibility that the shaft core of the yoke and the center of the through hole of the end cap are positioned apart from each other due to errors of assembling.

SUMMARY OF THE INVENTION

In view of the above-described circumstances, it is an object of the present invention to provide a yoke manufacturing method, a stator manufacturing method, and a motor, which allow formation of a satisfactory magnetic circuit and also ensure high positional accuracy of an insertion hole through which a rotating shaft passes.

A first aspect of the present invention is a method for manufacturing a yoke in a motor which is structured to include a rotor, magnets, and a yoke which forms a part of a magnetic circuit, comprising: a press process in which a flat plate-shaped base plate having a bottom portion and a side wall portion extending from an outer peripheral end of the bottom portion by cutting out from a metal plate and a rotating-shaft insertion hole through which a rotating shaft of the rotor passes is formed at a predetermined position in the bottom portion; and a bending process which allows bending of a border portion between the bottom portion and the side wall portion of the base plate and also allows the side wall portion to be curved around the rotating-shaft insertion hole.

In the yoke manufacturing method having the above-described structure, first, a flat base plate having a bottom portion with a rotating-shaft insertion hole formed thereon and a side wall portion is formed by cutting out from a metal plate in a press process. The base plate subjected to the press process is bent at a border portion between the side wall portion of the base plate and the bottom portion by a bending process and a yoke is thereby formed.

In this yoke manufacturing method, the yoke is formed by one sheet of metal plate subjected to the press process and the bending process. For this reason, as compared with a conventional motor having a yoke formed by deep drawing, the wall thickness of the yoke is made uniform and a satisfactory magnetic circuit can be obtained.

Further, in the motor formed by the yoke manufacturing method according to the present invention, the bottom portion, the side wall portion, and the rotating-shaft insertion hole are formed by the press process, and therefore, the central position of the rotating-shaft insertion hole with respect to the side wall portion is determined by one press process. Accordingly, as compared with a conventional motor in which a cylindrical yoke and an end cap are formed separately, the accuracy of the central position of the rotating-shaft insertion hole with respect to the side wall portion is improved. As a result, deviation from the center of a rotating shaft can be prevented.

Meanwhile, the yoke mentioned in the present invention is a yoke which holds a magnet of a motor in an interior thereof and forms a magnetic circuit therein.

Further, the bending process mentioned herein is a process in which a flat base plate is bent to be plastically deformed.

According to another aspect of the present invention, there is provided a connecting process in which both end portions of the side wall portion subjected to the bending process in a circumferential direction of the rotating-shaft insertion hole are connected to each other so that the base plate has a substantially cylindrical configuration.

For this reason, opening of the yoke caused by an abrupt external force is prevented.

According to still another aspect of the present invention, the side wall portion includes two side wall portions which extend symmetrically from both sides of the bottom portion in a state of being formed as the base plate in a circumferential direction of the rotating-shaft insertion hole, and a magnet mounting process is provided in which a pair of magnets are disposed within the side wall portions subjected to the bending process in such a manner as to face each other along the side wall portions and portions where the side wall portions are connected are caused to correspond to intermediate portions of these magnet in the transverse direction.

In the yoke manufacturing method having the above-described structure, magnets are disposed to face each other along the side wall portions of the base plate subjected to the bending process. Here, the connecting portions of the side wall portions are caused to correspond to the intermediate portions of the magnets, and therefore, among magnetic flux generated from one of magnetic poles of each magnet and returning to the other magnetic pole through the side wall portions, magnetic flux passing through the connecting portions of the side wall portions decreases or becomes lost.

For this reason, leakage flux generated at the time of passing through the connecting portions of the side wall portions decreases and a further excellent magnetic circuit can be obtained.

Meanwhile, the magnet mentioned herein is a magnet which, when a coil formed in a rotor of a motor is energized to form an electromagnet, attracts or repels each other to rotate the rotor.

A stator manufacturing method according to the present invention is a method for manufacturing a stator in a motor structured to include a stator having magnets and a yoke which forms a part of a magnetic circuit and also include a rotor, the method comprising: a press process in which a flat plate-shaped base plate having a bottom portion and a side wall portion extending from an outer peripheral end of the bottom portion by cutting out from a metal plate and a rotating-shaft insertion hole through which a rotating shaft of the rotor passes is formed at a predetermined position in the bottom portion; a bending process which allows bending of a border portion between the bottom portion and the side wall portion of the base plate and also allows the side wall portion to be curved around the rotating-shaft insertion hole; and a magnet mounting process in which a pair of magnets are disposed within the side wall portion subjected to the bending process in such a manner as to face each other on a concentric circle with the rotating-shaft insertion hole as the center.

In the stator manufacturing method according to the present invention, the stator is formed by one sheet of metal plate subjected to the press process and the bending process. For this reason, as compared with a conventional motor having a stator formed by deep drawing, the wall thickness of the stator is made uniform and a satisfactory magnetic circuit is obtained.

Further, as compared with a conventional motor in which a cylindrical stator and an end cap are formed separately, the motor formed by the stator manufacturing method according to the present invention allows improvement in accuracy of the central position of the rotating-shaft insertion hole with respect to the side wall portion. As a result, deviation from the center of the rotating shaft can be prevented.

A motor according to one aspect of the present invention is characterized by that a yoke includes a bottom portion having a rotating-shaft insertion hole through which a motor rotating shaft passes and also includes a side wall portion which extends from an outer peripheral end portion of the bottom portion, at least a portion of the side wall portion being curved along a concentric circle with the rotating-shaft insertion hole as the center.

According to the motor having the above-described structure, the side wall portion of the yoke is connected to the bottom portion, and further, the side wall portion and the bottom portion are formed by effecting the die cutting process and the bending process for one sheet of metal plate.

Accordingly, as compared with the conventional motor having a yoke formed by deep drawing, the wall thickness of the yoke is made uniform and a satisfactory magnetic circuit can be obtained.

In the yoke of the motor according to the present invention, the bottom portion, the side wall portion, and the rotating-shaft insertion hole are formed by the die cutting or press cutting process of one sheet of metal plate, and therefore, the central position of the rotating-shaft insertion hole with respect to the side wall portion is determined by one die cutting process. Accordingly, as compared with a conventional motor in which a cylindrical yoke and an end cap are formed separately, the accuracy of the central position of the rotating-shaft insertion hole with respect to the side wall portion is improved. For this reason, deviation from the center of a rotating shaft can be prevented.

Meanwhile, the bending process mentioned herein includes, for example, dies bending, but the bending process in the present invention is not limited to the same.

A motor according to another aspect of the present invention is a motor structured to include a rotor, magnets, and a yoke which forms a part of a magnetic circuit, wherein the yoke includes: a bottom portion having a rotating-shaft insertion hole through which a rotating shaft of the rotor passes; and a side wall portion formed by a single plate so as to be integrated with the bottom portion, projecting from a portion of an outer periphery of the bottom portion in a direction along a tangential line of the bottom portion, bent at a portion where the side wall portion is connected to the bottom portion substantially perpendicular to the bottom portion, the side wall portion having magnet placing portions which are curved coaxially with the rotating-shaft insertion hole.

In the motor having the above-described structure, the yoke is formed by a single metal plate subjected to the press process and the bending process, and therefore, as compared with a conventional motor having a yoke formed by deep drawing, the wall thickness of the yoke is made uniform and a satisfactory magnetic circuit can be obtained.

Further, in this motor, the bottom portion, the side wall portion, and the rotating-shaft insertion hole are formed by the press process. For this reason, the central position of the rotating-shaft insertion hole with respect to the side wall portion is determined by one press process. Accordingly, as compared with a conventional motor in which a cylindrical yoke and an end cap are formed separately, the accuracy of the central position of the rotating-shaft insertion hole with respect to the side wall portion is improved. As a result, deviation from the center of a rotating shaft can be prevented.

DESCRIPTION OF THE PREFERRED EMBODIMENTS

Figure 1:
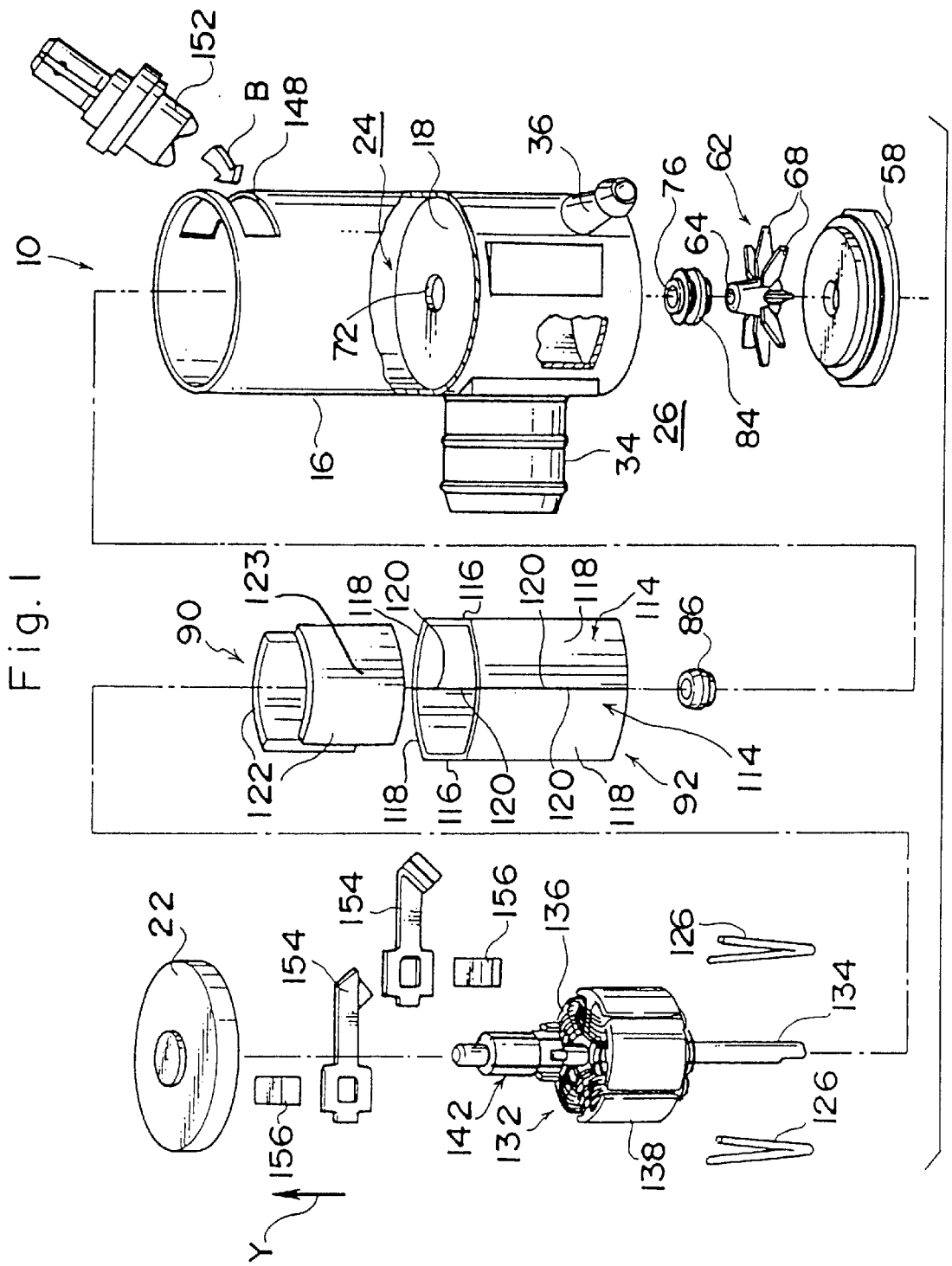
FIG. 1 is an exploded perspective view of a motor according to a first embodiment of the present invention.
Figure 2:
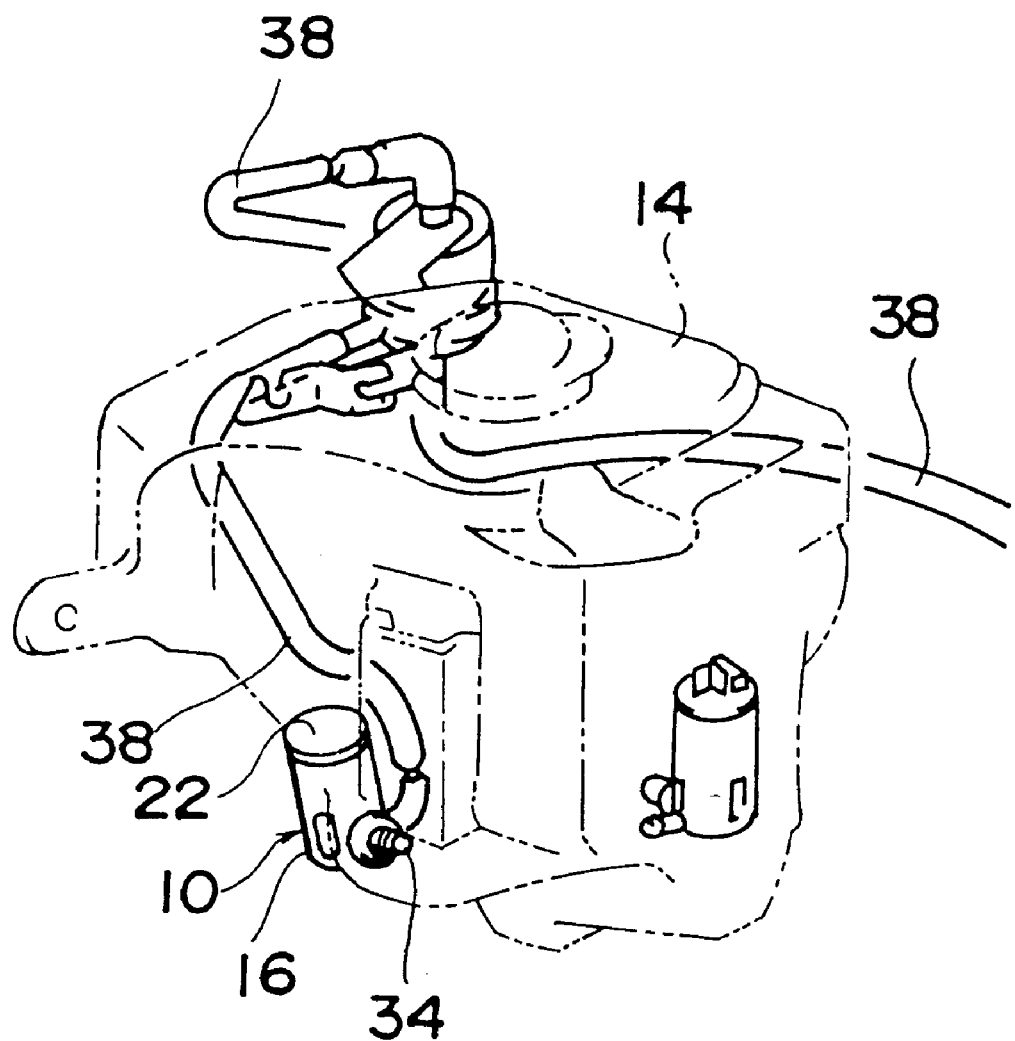
FIG. 2 is a perspective view which schematically shows a washer tank to which the motor according to the first embodiment of the present invention is applied.
Figure 3:
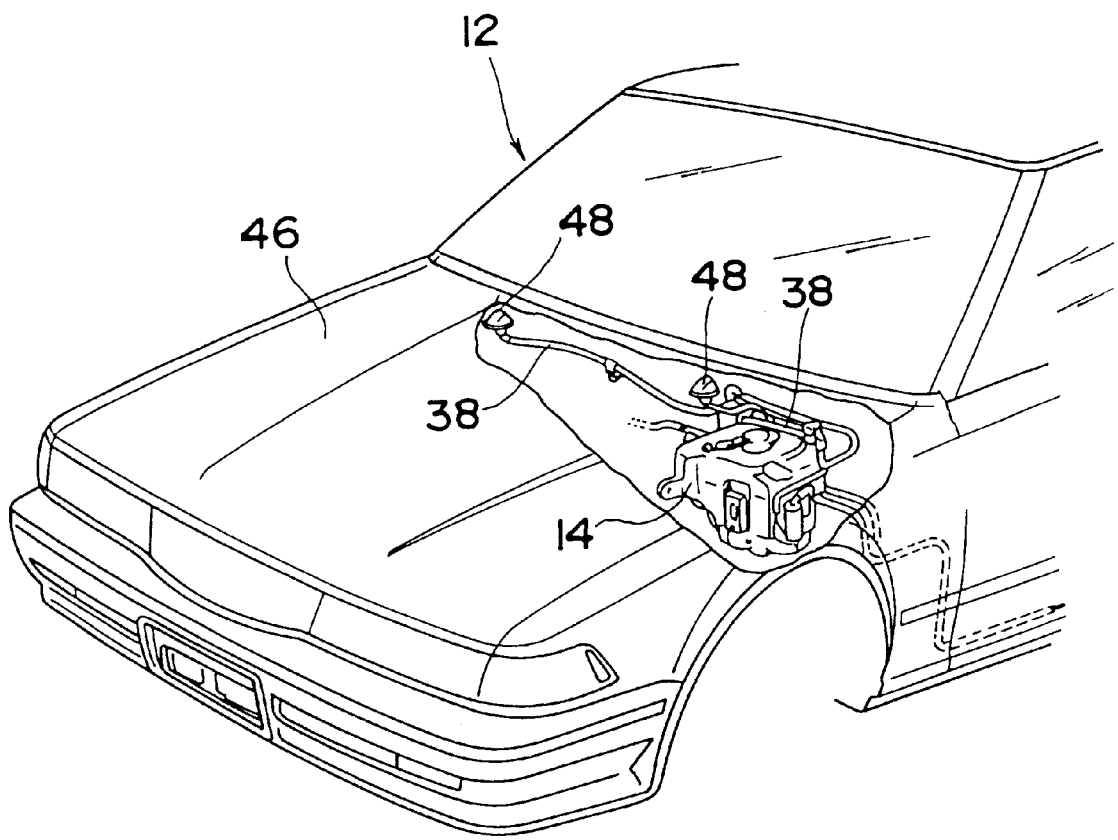
FIG. 3 is a perspective view which schematically shows a vehicle to which the washer tank shown in FIG. 2 is applied.

FIG. 1 is an exploded perspective view of a washer motor 10 (which will be hereinafter referred to simply as a motor 10) as a motor according to a first embodiment of the present invention. FIG. 2 is a schematic perspective view of a washer tank 14 to which the motor 10 is applied. FIG. 3 is a schematic perspective view of a vehicle 12 to which the washer tank 14 is applied.

As shown in FIG. 2, the motor 10 is provided in the vicinity of the lower end of the side wall of the washer tank 14. Further, as shown in FIG. 1, the motor 10 has a substantially cylinder-shaped case 16. The case 16 is formed by a synthetic resin material or the like substantially in the shape of a cylinder with upper and lower ends being opened. Further, the case 16 also has an inner bottom 18 formed inside. The upper side of the case 16 in the axial direction above the inner bottom 18 is formed as a motor chamber 24 and the lower side of the case 16 below the inner bottom 18 is formed as a passage 26 for a washer liquid.

An inlet 34 and an outlet 36 are formed in the outer peripheral portion of the case 16 at the side of the lower end thereof in such a manner as to each project outward in the radial direction of the case 16. The inlet 34 is formed into a cylinder and one end thereof is opened at an inner side of the passage 26 so as to communicate with the interior of the passage 26. The other end of the inlet 34 is fitted into an engaging hole (not shown) provided in the side wall of the washer tank 14 shown in FIG. 2 so as to communicate with the interior of the washer tank 14. Accordingly, when a negative pressure is generated in the interior of the inlet 34, the washer liquid filled in the washer tank 14 can be attracted by suction toward the passage 26 of the case 16.

The outlet 36 also has the shape of a cylinder with both ends opened. One end of the outlet 36 is opened at the inner side of the passage 26 so as to communicate with the interior of the passage 26. The other end of the outlet 36 is connected to washer nozzles 48 provided in a bonnet 46 of the vehicle 12 shown in FIG. 3 via hoses 38 shown in FIG. 2, or the like.

Further, as shown in FIG. 1, a cover 58 is fitted into the lower end portion of the case 16 and the lower end portion of the case 16, i.e., the open end of the passage 26 is closed. An impeller 62 is provided in the interior of the passage 26. An engaging portion 64 is formed at the center of the impeller 62 and a lower end portion of a rotating shaft 134 serving as a motor rotating shaft (which will described later) is fitted into and integrated with the engaging portion 64. A plurality of blades 68 are formed projectingly in the outer peripheral portion of the engaging portion 64. When the impeller 62 rotates, these blades 68 generates a negative pressure in the interior of the inlet 34, thereby resulting in that the washer liquid within the washer tank 14 is attracted by suction toward the passage 26 and the attracted washer liquid is transferred to the outlet 36 at a predetermined pressure.

Moreover, as shown in FIG. 1, a through hole 72 is formed at the center of the inner bottom 18 of the case 16 and a sealing member 84 having a through hole 76 formed at the center thereof is fitted into the through hole 72. Further, a bearing 86 is fixed at the sealing member 84 at the position above the intermediate portion in the axial direction of the through hole 76 (i.e., at the side of the motor chamber 24) and supports the rotating shaft 134 in pivotal manner.

Figure 4:
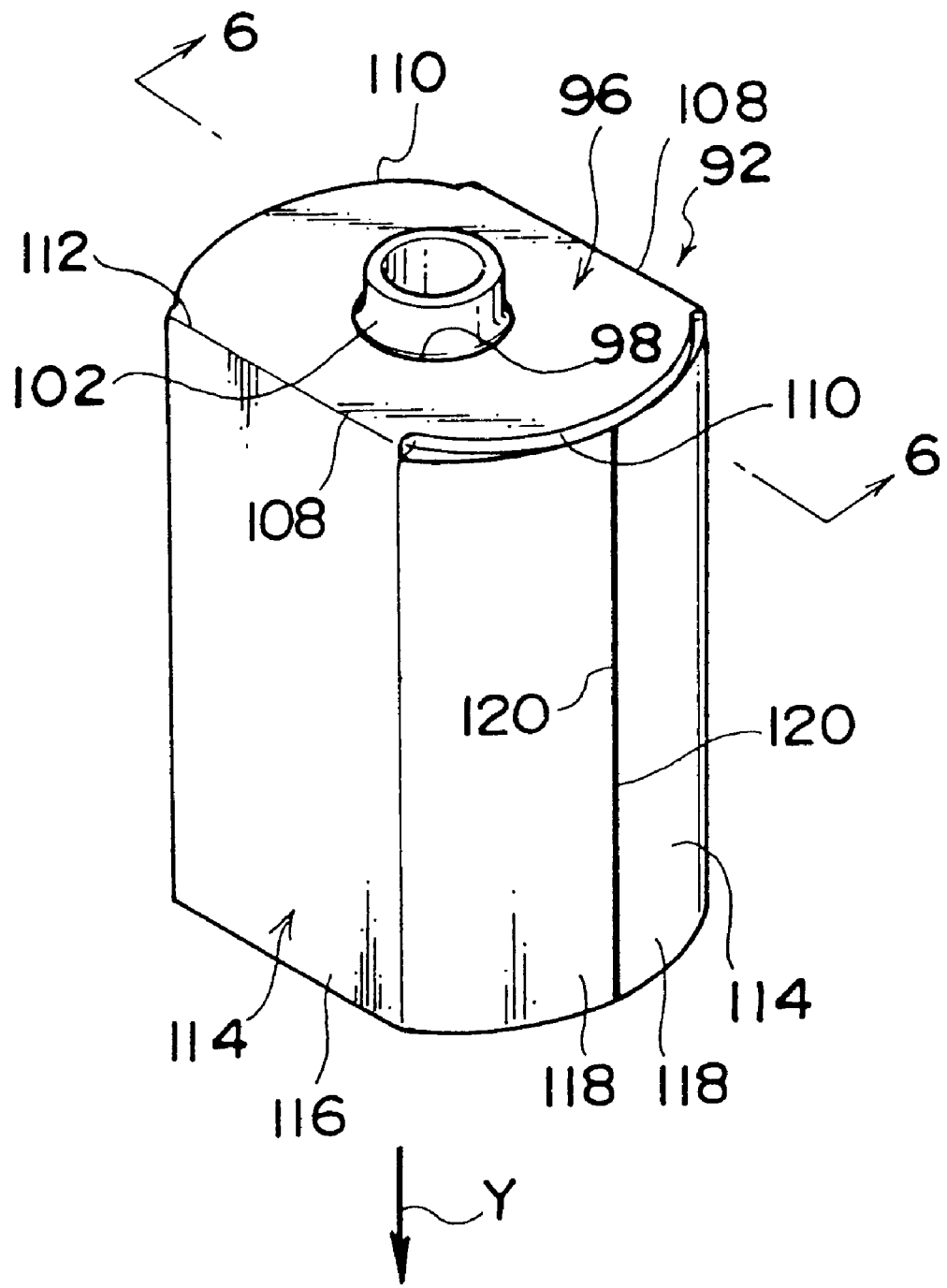
FIG. 4 is a perspective view of a yoke of the motor according to the first embodiment of the present invention, the yoke being shown in an upside-down state.
Figure 5:
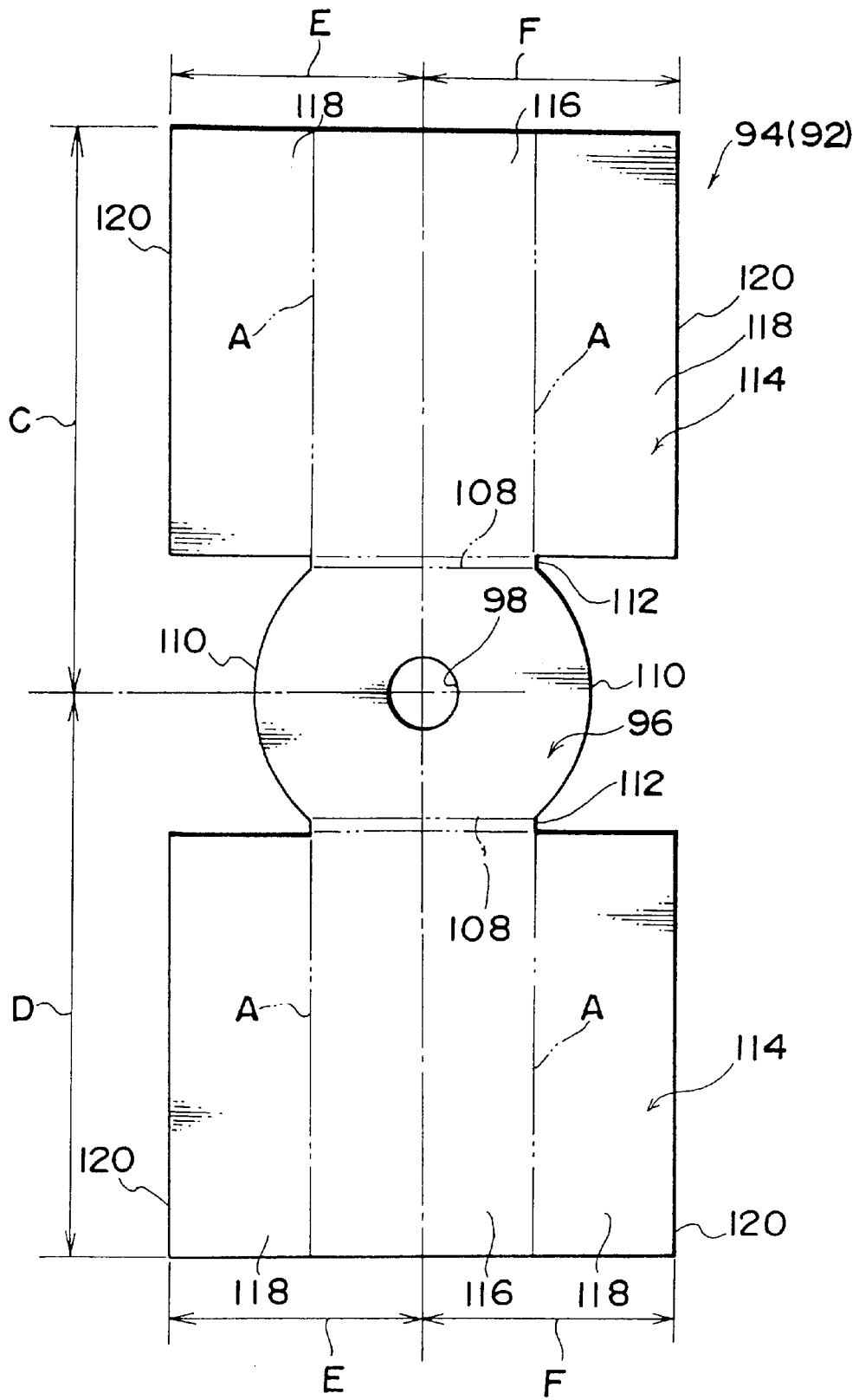
FIG. 5 is a development diagram of the yoke, i.e., a plan view of a base plate.

The motor chamber 24 of the case 16 accommodates a yoke 92 which forms a stator 90 together with magnets 122, which will be described later. FIG. 4 shows a perspective view with the yoke 92 being enlarged in an upside-down state, and FIG. 5 shows a plan view of a base plate 94 with the yoke 92 in a developed state.

As shown in FIG. 4, the yoke 92 (i.e., the base plate 94) includes a bottom portion 96. The outer peripheral portion of the bottom portion 96 is formed by a set of straight line portions 108 provided parallel to each other and a set of circular arc portions 110 which face each other along the longitudinal direction of the straight line portions 108 and also project outward. The bottom portion 96 has, as a whole, a rectangular configuration in which sides at both ends thereof in the longitudinal direction are each formed into a circular arc (or a configuration with facing portions of the outer periphery of a circle being cut off parallel with each other to form the straight line portions 118).

The above-described both circular arc portions 110 are each curved at the same curvature and have the same center of curvature (namely, the both circular arc portions 110 are formed concentrically). Formed at this center of curvature is a rotating-shaft insertion hole 98 through which the rotating shaft 134 of the motor 10 (i.e., the rotating shaft 134 of a rotor 132, which will be described later) passes. A bearing holder 102 is fitted into the insertion hole 98.

Figure 6:
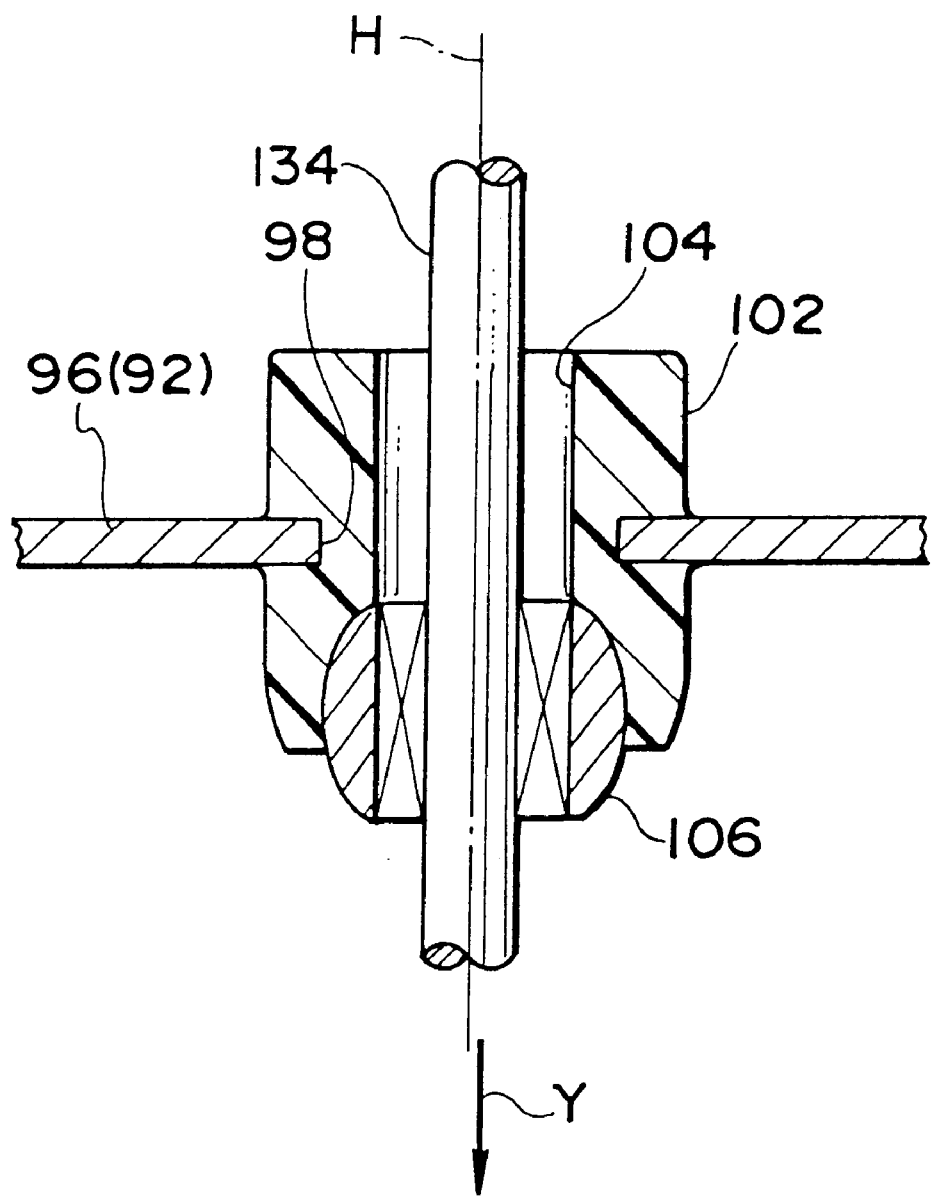
FIG. 6 is a cross-sectional view taken along the line 6—6 in FIG. 4, with a region of the yoke in the vicinity of an insertion hole through which a rotating shaft passes being enlarged.

As shown in the cross-sectional view of FIG. 6, the bearing holder 102 is formed by an elastically deformable synthetic resin material or a rubber material and a through hole 104 formed coaxially with the insertion hole 98 is formed in the bearing holder 102 in such a state that the bearing holder 102 is fitted into the insertion hole 98. Further, a bearing 106 is elastically held by the through hole 104 of the bearing holder 102 in such a manner as to be rotatable around an axis thereof with respect to the bearing holder 102.

Figure 11:
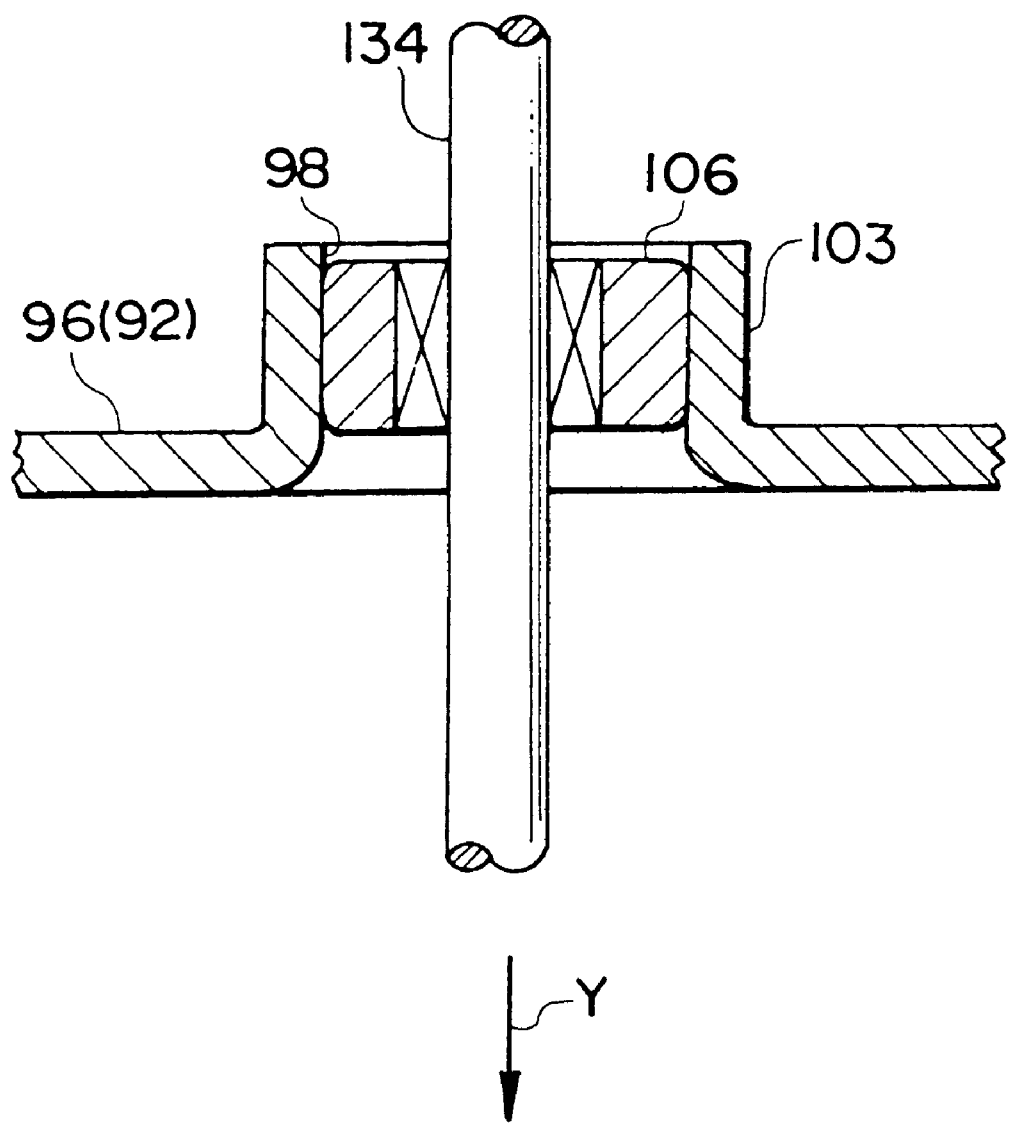
FIG. 11 is a cross-sectional view corresponding to FIG. 6, which shows a modified example with the insertion hole through which the rotating shaft passes being subjected to burring processing.

Meanwhile, the structure for holding the bearing 106 is not limited to the above-described structure. For example, as shown in FIG. 11, a peripheral end portion of the rotating-shaft insertion hole 98 (i.e., a portion of the bottom portion 96) is formed by press processing such as burring as a cylinder-shaped bearing holder portion 103 extending along the axial direction of the rotating-shaft insertion hole 98 and the bearing holder portion 103 thus formed may be used in place of the bearing holder 102 shown in FIG. 6. In this case, an injection molding process for mounting the bearing holder 102 at the bottom portion 96 becomes unnecessary.

Further, as shown in FIG. 5, side wall portions 114 are formed to extend from the straight line portions 108 of the bottom portion 96, respectively, in opposite directions via bend regions 112 each having a widthwise dimension slightly larger than the plate thickness of the bottom portion 96. In the developed state of the base plate 94, the side wall portions 114 are each formed into a rectangle of the same shape. Each of the side wall portions 114 is formed by a flat plate portion 116 connected to the straight line portion 108 of the bottom portion 96 via the bend region 112 and also by a pair of magnet mounting portions 118 extending from the flat plate portion 116.

With the base plate 94 being substantially formed as the yoke 92 (see the state shown in FIG. 10), the flat plate portion 116 corresponds to the straight line portion 108 of the bottom portion 96 and each of the magnet mounting portions 118 is curved so as to correspond to the circular arc portion 110 of the bottom portion 96. Further, an end portion of each magnet mounting portion 118 at the opposite side with respect to the flat plate portion 116 is formed as an abutting portion 120. The transverse dimension of each magnet mounting portion 118 (i.e., the dimension thereof in the direction along the circular arc portion 110 in the state in which the base plate 94 is formed substantially as the yoke 92) is approximately a half of the lengthwise dimension of the circular arc portion 110. When each magnet mounting portion 118 is curved along the circular arc portion 110, an abutting portion 120 of the magnet mounting portion 118 of one of the side wall portions 114 and an abutting portion 120 of the magnet mounting portion 118 of another side wall portion 114 face to contact each other at the central portion of the circular arc portion 110 in the longitudinal direction (namely, respective magnet mounting portions 118 of the side wall portions 114 are allowed to abut against each other).

The side wall portions 114 which are each structured by the flat plate portion 116 and the pair of magnet mounting portions 118 each have a longitudinal dimension such that the distances between the center of the rotating-shaft insertion hole 98 and each of both ends of the base plate 94 in the longitudinal direction (i.e., respective ends of the side wall portions 114 disposed at opposite sides with respect to the bottom portion 96), namely, dimensions C and D shown in FIG. 5 become equal to each other. Further, each of the side wall portions 114 is formed such that the dimensions between an imaginary line which passes through the center of the rotating-shaft insertion hole 98 to extend along the longitudinal direction of the side wall portion 114 and each of both ends of the side wall portion 114 in the transverse direction (i.e., dimensions E and F shown in FIG. 5) become equal to each other. The transverse dimension of each of the side wall portions 114 (i.e., the sum of the dimensions E and F shown in FIG. 5) is set to be a half the circumference of the bottom portion 96. For this reason, with the side wall portions 114 being subjected to bending processing, which will be described later, a simulated bottomed cylindrical yoke 92 as shown in FIG. 4 is formed.

As shown in FIG. 1, a pair of magnets 122 are provided within the yoke 92 in such a manner as to be curved in a concave manner and disposed such that the concave portions face each other. A pair of springs 126 each bent to have a substantially V-shaped configuration are disposed in clearances between end portions of the outer peripheral portions of the magnets 122 parallel to the axial direction of the rotating-shaft insertion hole 98 of the yoke 92. These springs 126 each have an urging force which constantly maintains an bending angle thereof with the bending portion set as the center. When the springs 126 are disposed between the outer peripheral portion of one of the magnets 122 and the outer peripheral portion of another magnet 122, the springs 126 hold the magnets 122 by the urging force thereof in such a manner as to push the magnets 122 against the side wall portions 114 of the yoke 92.

Meanwhile, in the present embodiment, there is provided the structure in which the magnets 122 are held by the urging force of the springs 126. However, the magnet holding means for holding the magnets 122 within the yoke 92 is not limited to urging means such as the spring 126. For example, the magnets 122 may also be held in such a manner as to be fixed within the yoke 92 by an adhesive or the like, which serves as the magnet holding means.

Here, each of the magnets 122 in a state of being held by being pushed against the side wall portions 114 is disposed in such a manner that the central portion 123 of the magnet 122 in the transverse direction (i.e., the central portion of the magnet 122 in an assembled state in the direction around the rotating shaft 134) and the intermediate portion between the abutting portion 120 of one of the side wall portions 114 and the abutting portion 120 of another side wall portion 120 (when both abutting portions 120 contact each other, these abutting portions 120 themselves) substantially coincide with each other.

The rotor 132 is disposed within these magnets 122. The rotor 132 includes the rotating shaft 134 of which one end passes through the inner bottom 18 to enter the passage 26 and is further engaged with the engaging portion 64 of the impeller 62. A core 138 is fixed at the intermediate portion of the rotating shaft 134 in the axial direction and has a plurality of slots and a plurality of coils wound in layers. As the core 138, a laminated iron core is used in which, for example, silicon steel sheets are laminated in the axial direction of the rotating shaft 134. However, an iron core applied to the core 138 is not limited to the laminated iron core. Further, a commutator 142 having a plurality of commutator segments is disposed above the core 138 (i.e., at the side of the other end of the rotating shaft 134 in the axial direction) coaxially with the core 138 and the rotating shaft 134 and each of the commutator segments is electrically connected to the core 138.

As shown in FIG. 1, an opening portion 148 is formed in the outer peripheral portion of the case 16 at the side of the upper end thereof and a terminal connector 152 is inserted into the case 16 from outside along the direction indicated by arrow B. The terminal connector 152 is electrically connected via a control circuit (not shown) such as a relay to a power source such as an on-vehicle battery provided outside the case 16 and also to a switch (not shown) provided in the vicinity of a steering wheel of the vehicle 12. Further, a pair of brushes 156 held by a pair of brush holders 154 within the case 16 are electrically connected to the terminal connector 152. These brushes 156 each contact any of the plurality of commutator segments. The commutator segments of the commutator 142 is energized via the terminal connector 152 and the brushes 156 and the coils 136 are also energized.

Moreover, a lid 22 in which a bearing (not shown) is formed to support the rotating shaft 134 at the center of an end surface at the side of the motor chamber 24 is fitted into and fixed at the open end of the case 16 at the side of the motor chamber 24. As a result, the open end of the case 16 at the side of the motor chamber 24 is closed.

Next, operation and effects of the present embodiment will be described through a description of a manufacturing process of the yoke 92 (i.e., the stator 90) of the motor 10.

Figure 7:
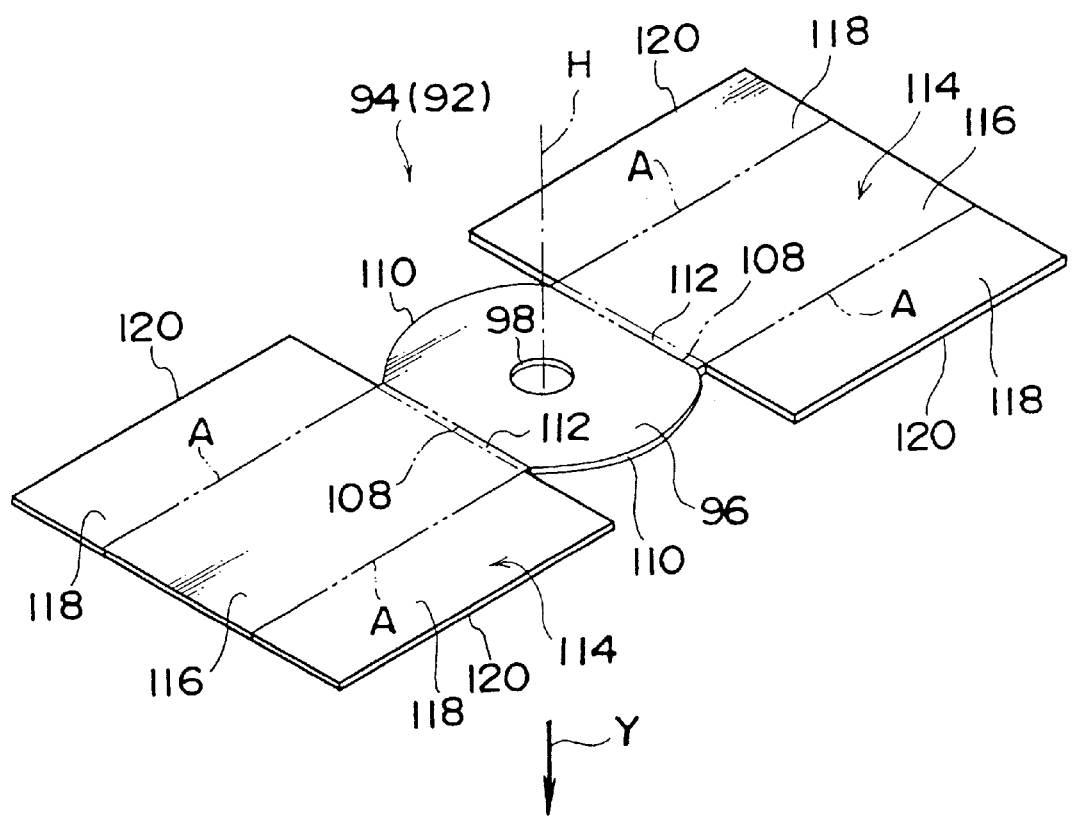
FIG. 7 is a perspective view of the base plate after a press process (after punching).

In the manufacturing process of the yoke 92, first, in the press process, the base plate 94 shown in FIGS. 5 and 7 is formed by being cut out by punching from one sheet of metal plate. In this state, although the bottom portion 96, the rotating-shaft insertion hole 98, the bend regions 112, the side wall portions 114, and the like are formed, the base plate 94 remains flat. In the press process, the outline of the base plate 94 is obtained by one press operation and the rotating-shaft insertion hole 98 is formed at the center of the bottom portion 96. Accordingly, when the dimensional accuracy of a press die (i.e., a die for punching) is strictly set in advance, as compared with a conventional yoke in which the bottom portion 96 and the side wall portions 114 are formed separately and the bottom portion 96 is fitted to the side wall portions 114, the positional accuracy of the rotating-shaft insertion hole 98 with respect to the side wall portions 114 can be improved and a deviation of the rotating shaft 134 of the motor 10 from the center of rotation can be prevented.

Figure 8:
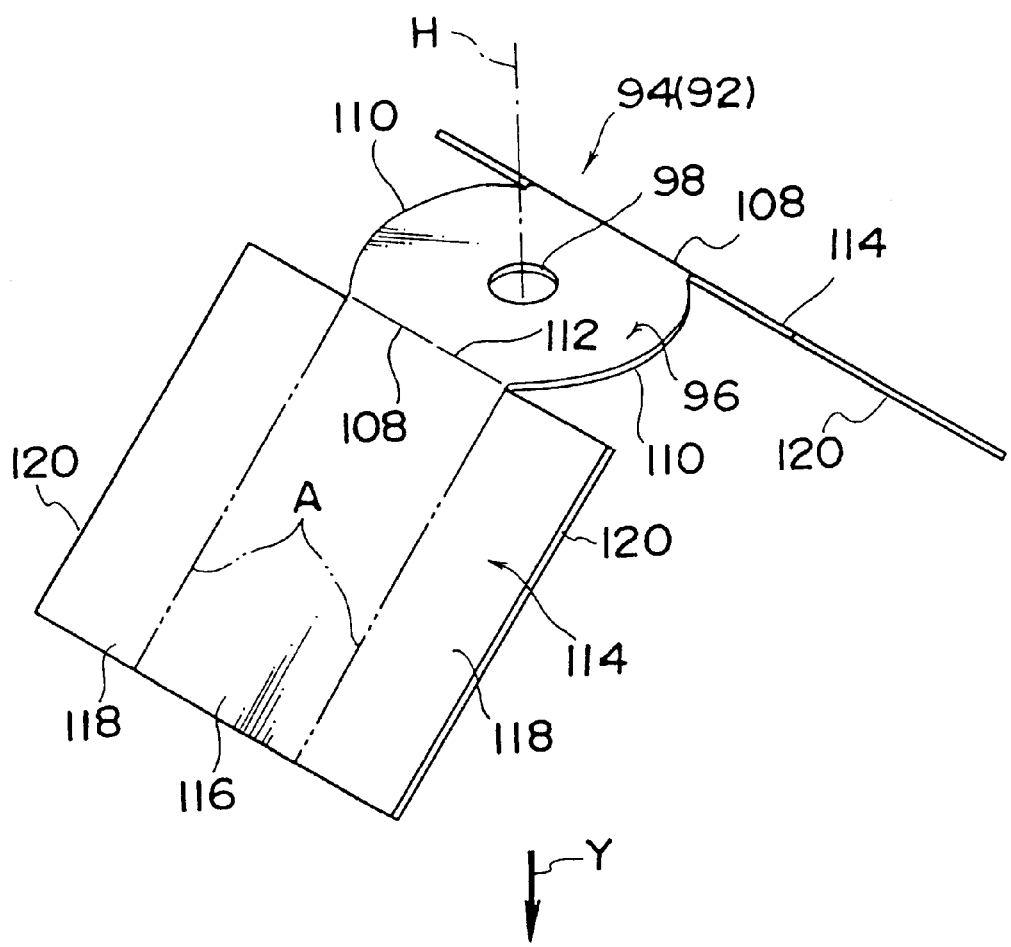
FIG. 8 is a perspective view corresponding to FIG. 7, which shows a side wall portion in the stage of being bent.

Next, the cut-out base plate 94 is subjected to a bending process such as dies bending. In this bending process, the base plate 94 is bent at the bend regions 112 until respective side surfaces of the side wall portions 114 are each made perpendicular to the end surface of the bottom portion 96 as indicated in the states shown in FIGS. 8 and 9 (i.e., until the side surfaces of the side wall portions 114 are made parallel to the axial direction of the rotating-shaft insertion hole 98). As a result, the base plate 94 has a concave configuration with the bottom portion 96 being opened in the direction indicated by arrow Y.

Figure 9:
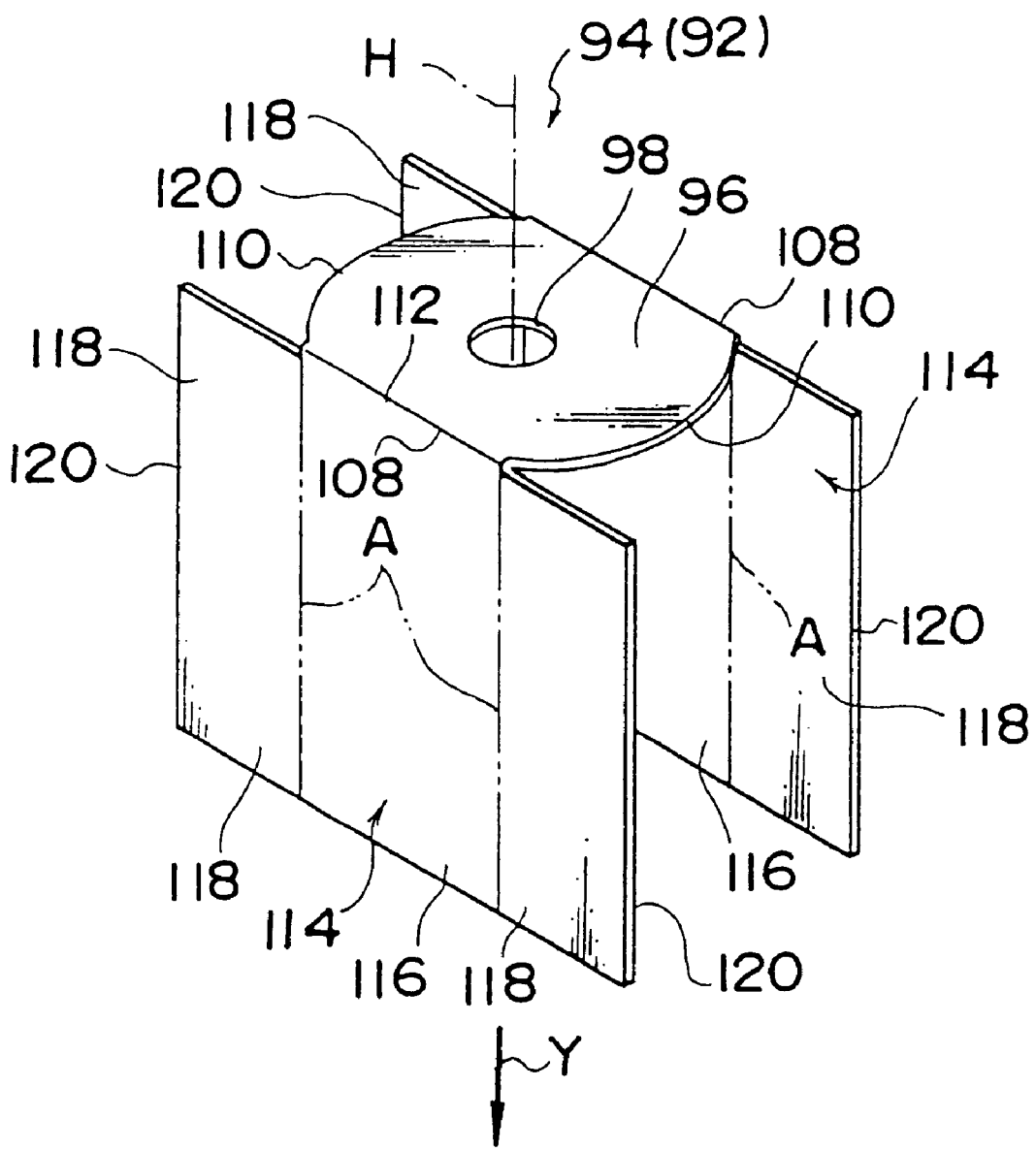
FIG. 9 is a perspective view corresponding to FIG. 7, which shows the side wall portion in the state of being completely bent.
Figure 10:
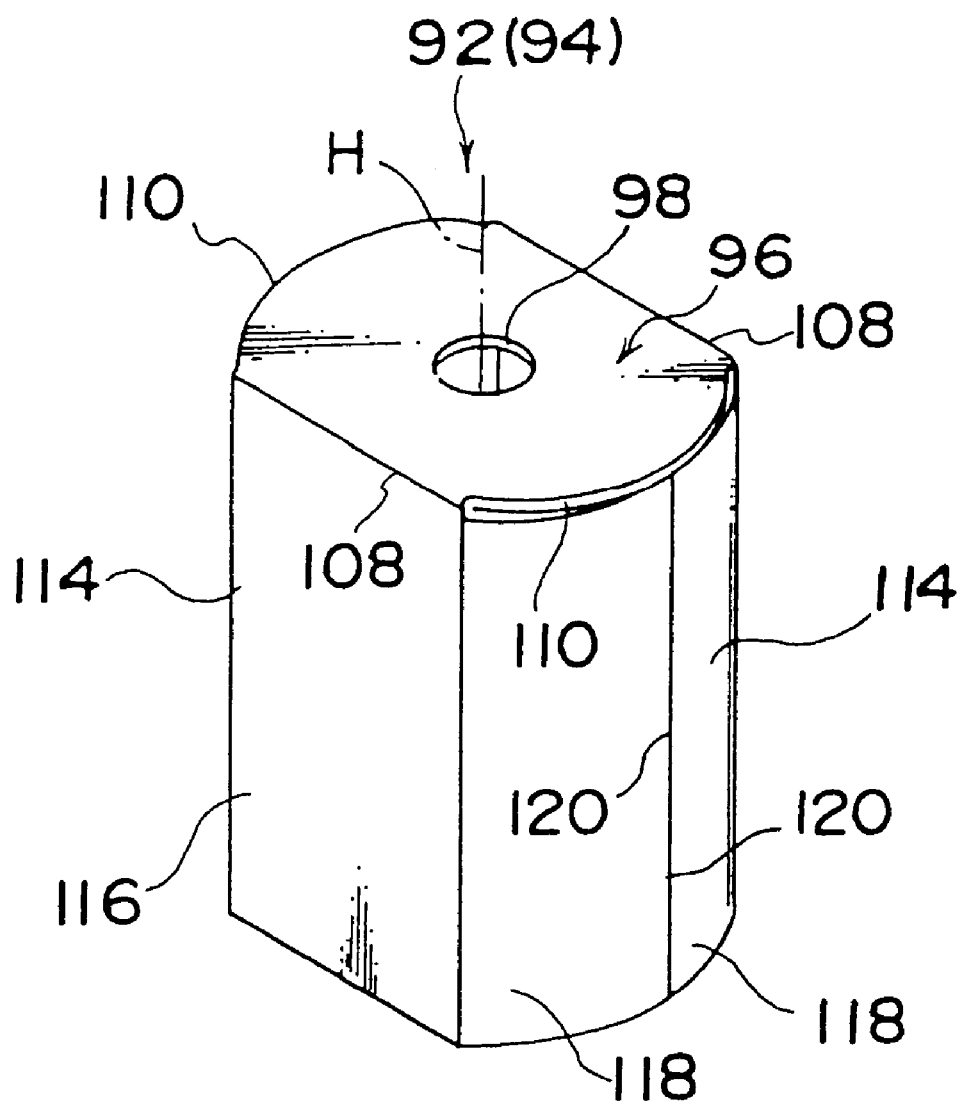
FIG. 10 is a perspective view corresponding to FIG. 7, with a magnet mounting portion being curved along a circular arc portion of a bottom portion.

Further, the side wall portions 114 are each bent at positions indicated by the two dot-chain lines A in FIG. 9, which are border lines of the flat plate portion 116 and the magnet holding portions 118, and the magnet holding portions 118 are each curved along the circular arc portion 110, thereby forming a concave configuration with the side wall portions 114 facing each other. As a result, as shown in FIG. 10, the abutting portion 120 of one of the side wall portions 114 and the abutting portion 120 of another side wall portion 114 face to contact each other, and the base plate 94, i.e., the yoke 92 is formed into a bottomed cylinder in a simulated manner. Further, in this state, the side wall portions 114 become axisymmetric with the axial line of the rotating-shaft insertion hole 98 (i.e., the one dot-chain line H shown in FIGS. 6 to 9) serving as an axis.

Here, generally in the case of the bending process such as dies bending, so long as the bend radius of an article to be processed (i.e., the base plate 94) is small and the vertical dimension (i.e., the dimension of the side wall portion 114 in the axial direction of the rotating-shaft insertion hole 98) is large, sufficient bending accuracy can be obtained. Further, in the case of the bending process as shown in the present embodiment, molding accuracy can be greatly improved by preventing spring back or warp of the side wall portions 114 due to, for example, application of coining pressure.

Accordingly, the dimensional accuracy of the base plate 94 after the bending process can be sufficiently maintained and a high positional accuracy of the rotating-shaft insertion hole 98 with respect to the side wall portions 114 can be ensured.

Next, the bearing holder 102 is mounted by injection molding at the rotating-shaft insertion hole 98 of the base plate 94 formed into a bottomed cylinder and the bearing 106 is fitted into the bearing holder 102, so that the yoke 92 is formed. Meanwhile, the mounting process of the bearing holder 102 by the injection molding does not need to be effected after the bending process so long as it is effected after the press process (i.e., after the rotating-shaft insertion hole 98 is formed). As shown in FIG. 11, when, in place of the bearing holder 102, a portion of the bottom portion 96 formed by the press process such as burring is used as the bearing holder portion 103, the above-described injection molding process is not required and the bearing holder portion 103 can be formed by, for example, a press process for cutting out the base plate 94 by punching.

The yoke 92 thus formed is accommodated in the motor chamber 24 of the case 16 in such a manner that an opening end thereof (i.e., the end at the opposite side with respect to the bottom portion 96 of the side wall portion 114) is directed toward the open end of the motor chamber 24.

Next, in the magnet mounting process, the magnets 122 are disposed within the yoke 92 in the above-described state, and the pair of springs 126 are disposed between these magnets 122. In this state, the magnets 122 are held by being pushed against the side wall portions 114 of the yoke 92 by the urging force of the springs 126.

Here, in the magnet mounting process, the magnets 122 are disposed in such a manner that the central portion of each magnet 122 in the transverse direction (i.e., the central portion of each magnet 122 in an assembled state in the direction around the rotating shaft 134) substantially coincides with the abutting portions 120 of the side wall portions 114. As a result, a magnetic circuit which allows connection between one magnetic pole of each magnet 122, the side wall portions 114 of the yoke 92, and another magnetic pole of the magnet 122 does not pass through between the facing abutting portions 120 of one and another side wall portions 114. Accordingly, there is no possibility that the magnetic flux of the magnet 122 passing through the magnetic circuit leak out from the position where the abutting portions 120 face each other.

As described above, the yoke 92 of the motor 10 according to the present embodiment is formed by pressing (die cutting) and bending one sheet of metal plate, and therefore, the plate thickness of each of the side wall portions 114 becomes uniform. Accordingly, as compared with a conventional motor with a yoke used which is formed by deep drawing, the magnetic characteristics of the motor 10 can be improved (i.e., a satisfactory magnetic circuit can be obtained).

Further, in the present embodiment, the yoke 92 is accommodated within the case 16, and therefore, the shape thereof can be maintained even if the side wall portions 114 do not adhere to each other to form a complete bottomed cylinder. Accordingly, the process which causes the side wall portions 114 to adhere to each other becomes unnecessary and the number of assembling processes can be reduced.

Meanwhile, in the present embodiment, the respective abutting portions 120 of the side wall portions 114 are allowed to abut against each other by the bending process, but the both end portions of one of the side wall portions 114 are not necessarily caused to abut against those of another side wall portion 114. Further, even when the structure is employed in which the both end portions of each side wall portion 114 are not caused to abut against with those of another side wall portion 114, so long as the position between the respective abutting portions 120 of the facing side wall portions 114 substantially coincides with the central portion 123 of each magnet 122 in the transverse direction (i.e., the central portion 123 of each magnet 122 in an assembled state in the direction around the rotating shaft 134), leakage flux passing through clearances between both ends of one side wall portion 114 in the transverse direction and both ends of another side wall portion 114 in the transverse direction decreases or becomes lost.

Next, a description will be given of other embodiments of the present invention. The following embodiments, which will be described later, are modified examples of the yoke 92 of the motor 10 according to the first embodiment of the present invention. Accordingly, a description of components other than those corresponding to the components of the yoke 92 will be omitted. Further, the basically same components of the yoke 92 as those of the first embodiment will be denoted by the same reference numerals, and a description thereof will be omitted.

Figure 12:
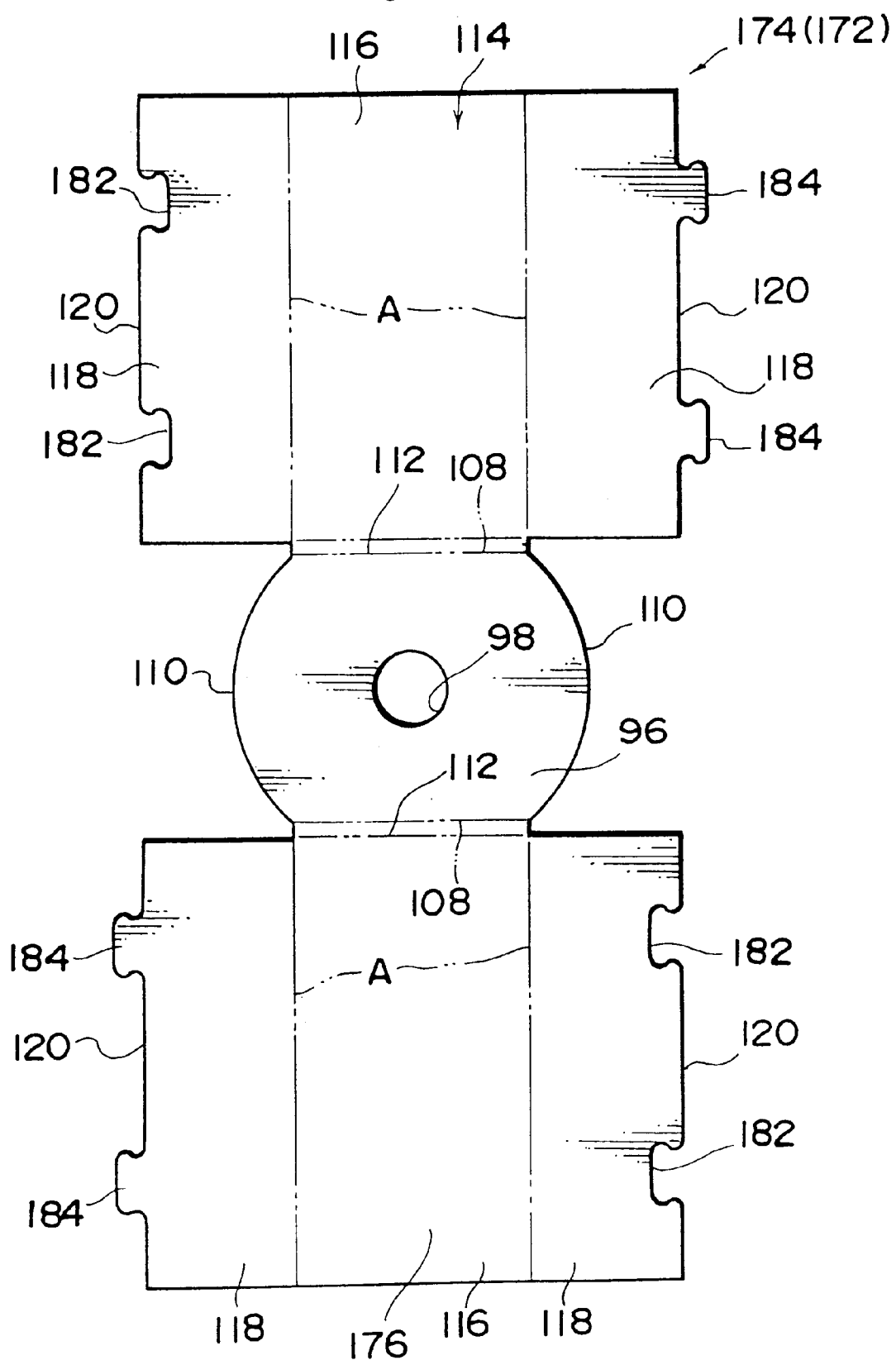
FIG. 12 is a development diagram of a yoke of a motor according to a second embodiment of the present invention, i.e., a plan view of a base plate.

FIG. 12 shows a development view of a yoke 172 which is applied to a motor according to a second embodiment of the present invention (i.e., a plan view of a base plate 174). As shown in this drawing, notched concave portions 182 serving as connecting means are formed in an abutting portion 120 of one of the magnet mounting portions 118 extending from each side wall portion 176 of the base plate 174. Convex portions 184 are formed in an abutting portion 120 of another magnet mounting portion 118 and form the connecting means together with the concave portions 182.

Figure 13:
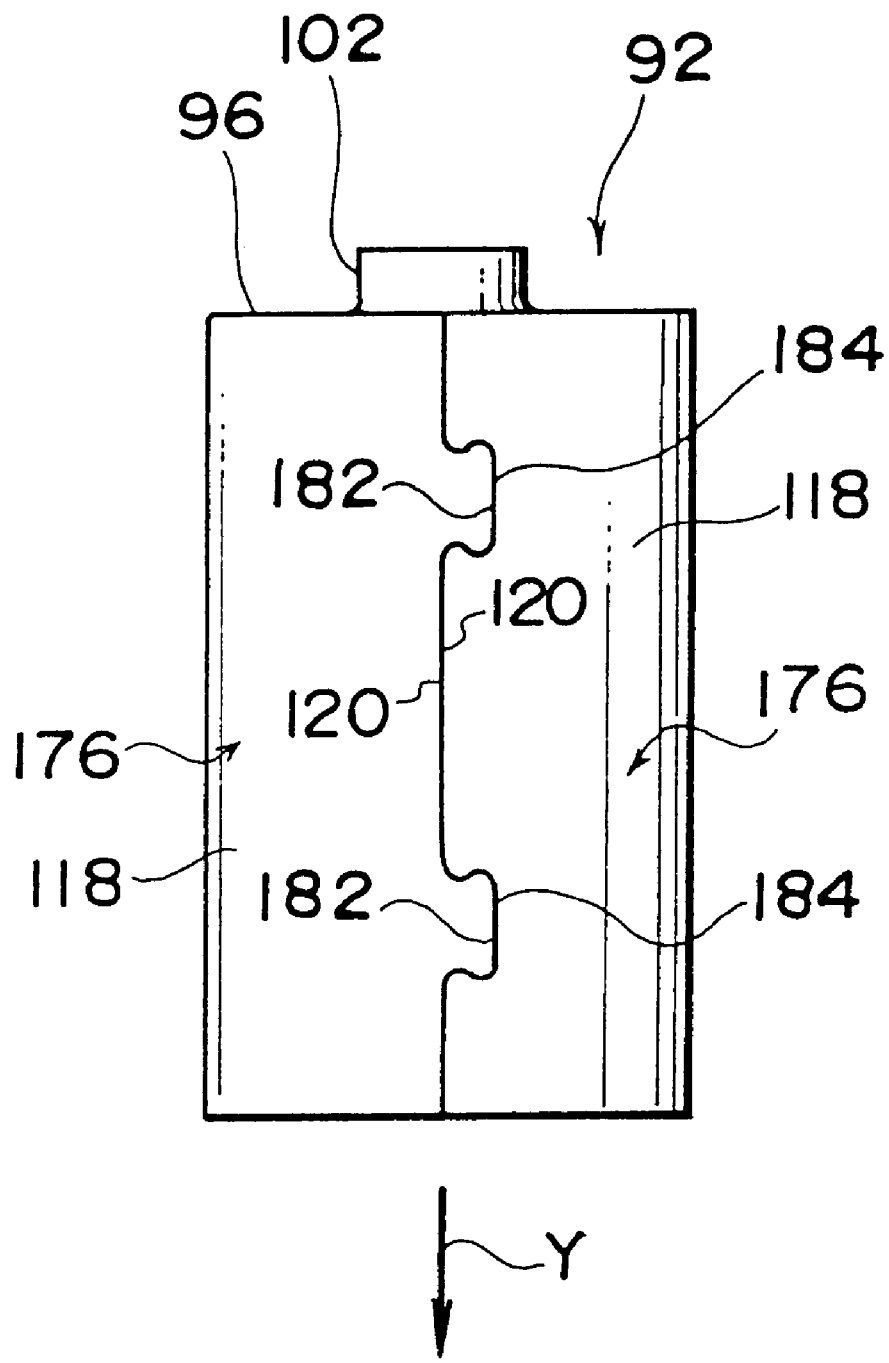
FIG. 13 is a side view of the yoke with both side wall portions being connected to each other.

The convex portions 184 can be engaged with the concave portions 182, respectively. As shown in FIG. 13, after the magnet mounting portions 118 of each of the side wall portions 176 are curved along the circular arc portion 110 of the bottom portion 96 by the bending process, the base plate 174 is subjected to connecting processing after the bending process. The convex portions 184 and the concave portions 182, which are formed in the magnet mounting portions 118 of one side wall portion 176, are respectively engaged with the convex portions 184 and the concave portions 182, which are formed in the magnet mounting portions 118 of another side wall portion 176. As a result, the base plate 174 is entirely formed into a bottomed cylinder.

In this state, the convex portions 184 are engaged with the concave portions 184, respectively, and therefore, unfolding of the yoke 92 caused by an abrupt external force can be prevented.

Next, a third embodiment of the present invention will be described.

Figure 14:
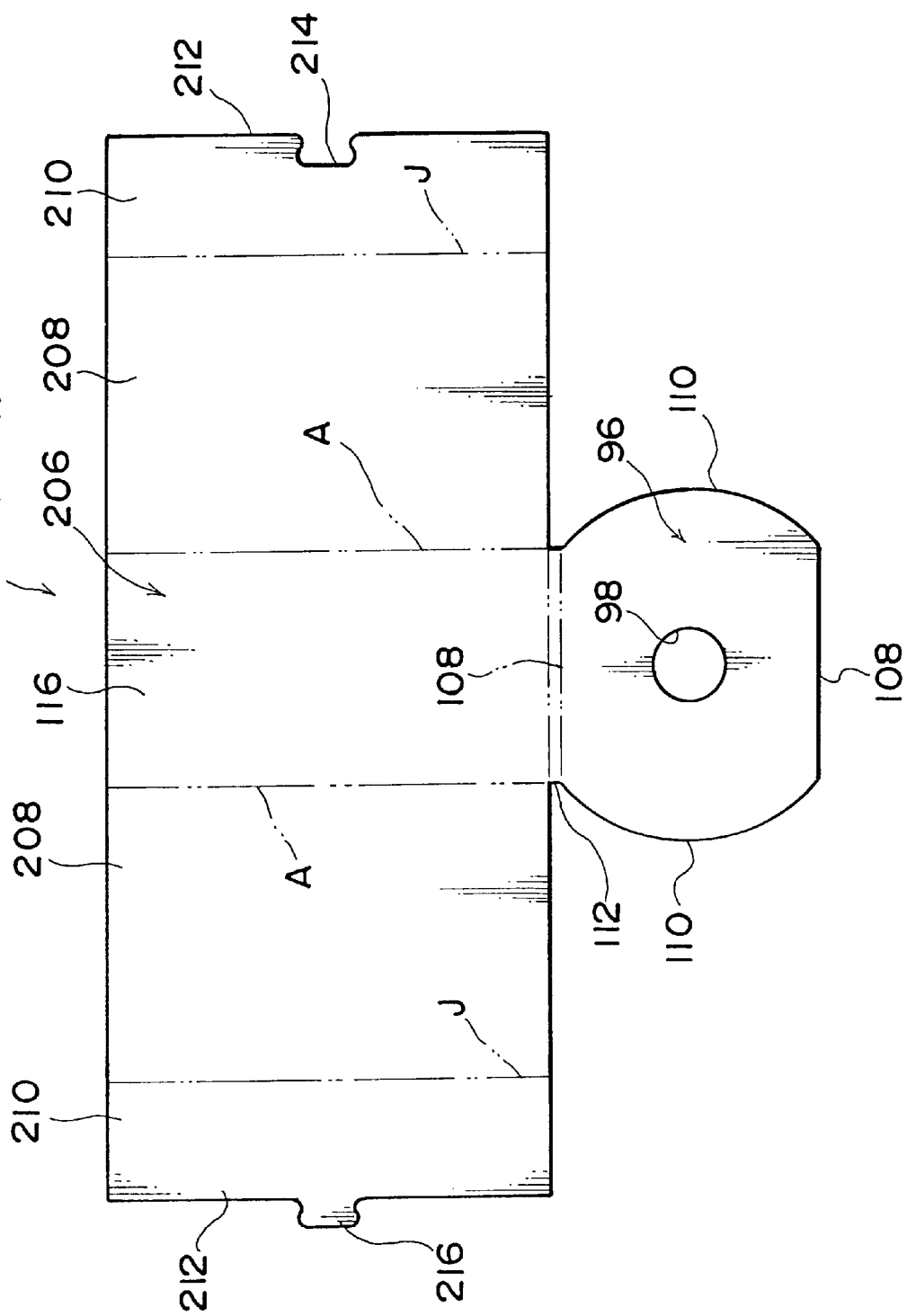
FIG. 14 is a development diagram of a yoke of a motor according to a third embodiment of the present invention, i.e., a plan view of a base plate.

FIG. 14 shows a development view of a yoke 202 which is applied to a motor according to the third embodiment of the present invention (i.e., a plan view of a base plate 204). As shown in this drawing, in this embodiment, the bend region 112 and a side wall portion 206 are formed only at the side of one of the pair of straight line portions 108 of the bottom portion 96. The side wall portion 206 is different from the side wall portion 114 shown in the above-described first embodiment and is formed by the flat plate portion 116, magnet mounting portions 208, and flat plate portions 210.

Figure 17:
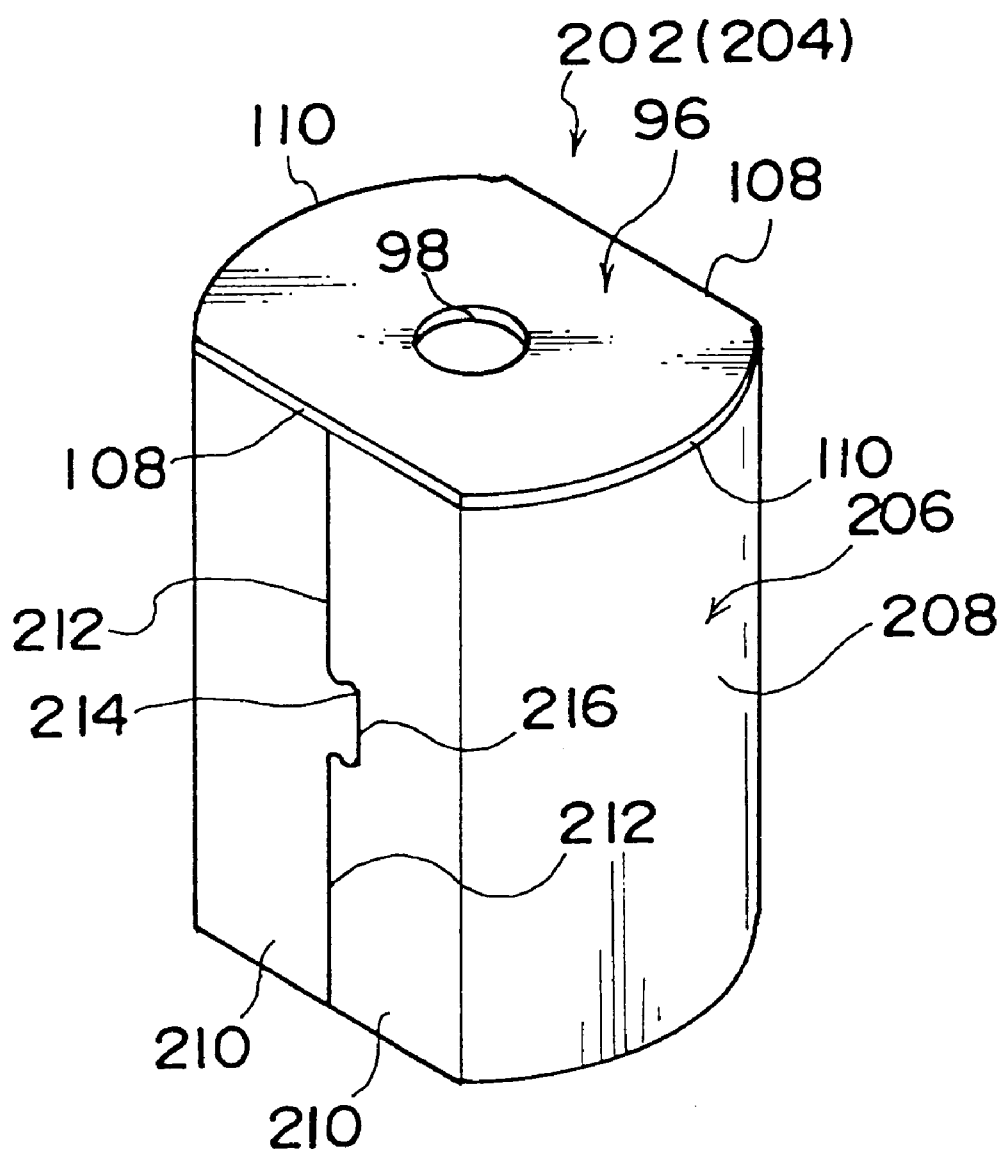
FIG. 17 is a perspective view corresponding to FIG. 16, with a magnet mounting portion being curved along a circular arc portion of a bottom portion.

The magnet mounting portion 208 is formed in a manner similar to the magnet mounting portion 118 of the first embodiment in that the magnet mounting portions 208 are formed at both ends of the flat plate portion 116 in the transverse direction. However, in the above-described first embodiment, the transverse dimension of the magnet mounting portion 118 (i.e., the dimension thereof in the direction along the circular arc portion 110 of the bottom portion 96 in the state in which the base plate is formed as the yoke 92) is about a half of the length of the circular arc portion 110 and the totaled transverse dimension of the facing magnet mounting portions 118 formed in one side wall portion 114 and in another side wall portion 114 with respective abutting portions 120 of these side wall portions 114 contacting each other becomes substantially equal to the length of the circular arc portion 110. On the other hand, the transverse dimension of each of the magnet mounting portions 208 in this embodiment is substantially equal to the length of the circular arc portion 110, and in the state in which the base plate 204 is formed as the yoke 202 (see FIG. 17), the magnet mounting portions 208 are each curved along the substantially entire region of the arcuate portion 110.

Further, the first embodiment has the structure in which the transverse-directional end portion of the magnet mounting portion 118, which is disposed at the opposite side with respect to the flat plate portion 116, is formed as the abutting portion 120. However, in this embodiment, the flat plate portion 210 extends from a transverse-directional end of the magnet mounting portion 208 at an opposite side with respect to the flat plate portion 116 and a transverse-directional end of each of the flat plate portions 210 at an opposite side with respect to the magnet mounting portion 208 is formed as an abutting portion 212 which corresponds to the abutting portion 120 of the first embodiment.

In the state in which the base plate 204 is formed as the yoke 202 (see FIG. 17), the flat plate portions 210 are each disposed to face the flat plate portion 116 so as to form a pair with the flat plate portion 116. However, as shown in FIG. 14, the transverse dimension of each of the flat plate portions 210 (i.e., the dimension thereof in the direction along the straight line portion 108 of the bottom portion 96 in the state in which the base plate 204 is formed as the yoke 202) is about a half of the length of the straight line portion 108 of the bottom portion 96 and the sum of the respective transverse dimensions of the two flat plate portions 210 is set to be substantially equal to the length of the straight line portion 108 of the bottom portion 96.

Further, a concave portion 214 corresponding to the concave portion 182 of the above-described second embodiment is formed in the abutting portion 212 of one of the flat plate portions 210 and a convex portion 216 corresponding to the convex portion 184 of the second embodiment is formed in the abutting portion 212 of another flat plate portion 210.

Figure 15:
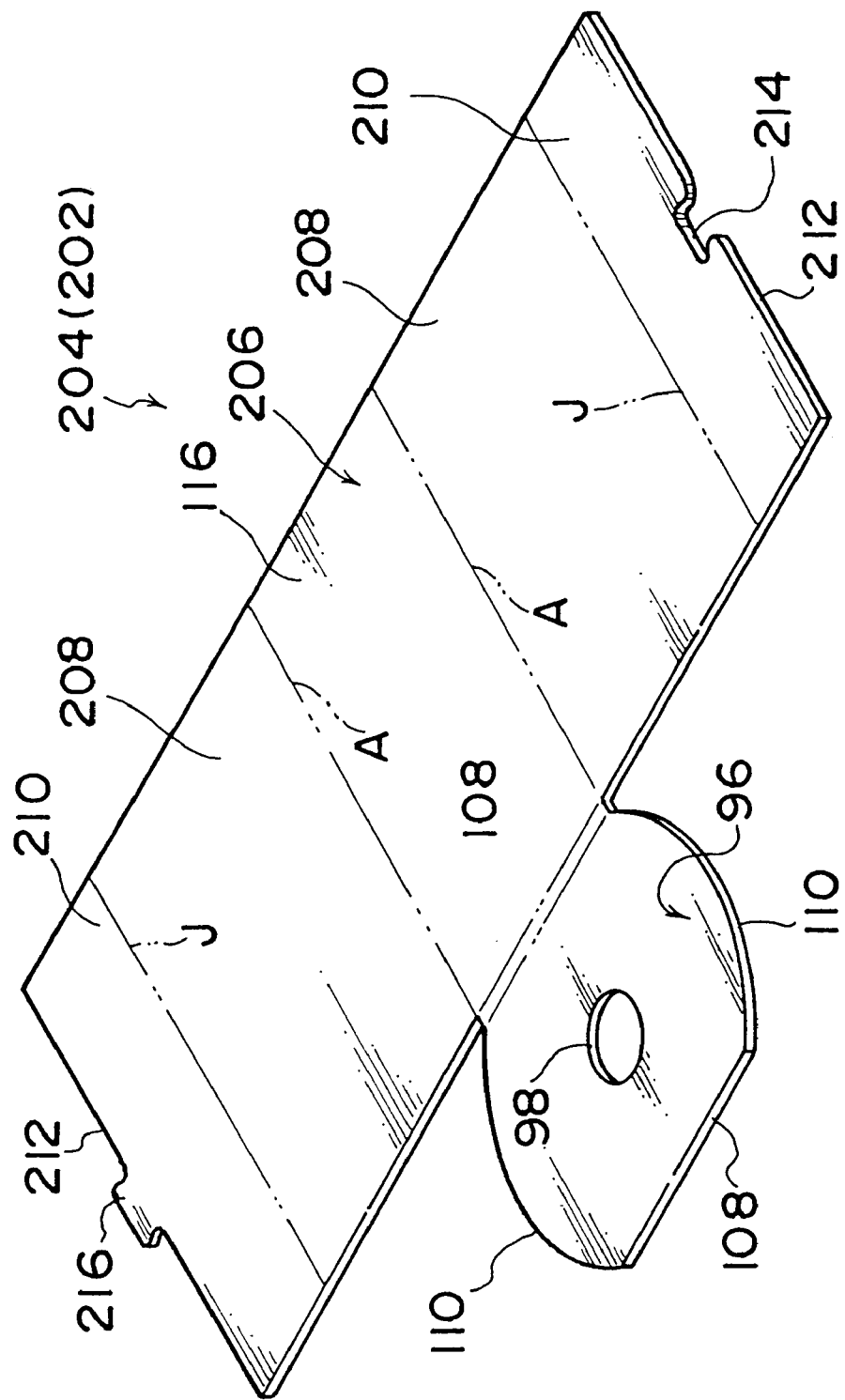
FIG. 15 is a perspective view of the base plate after a press process (after punching).
Figure 16:
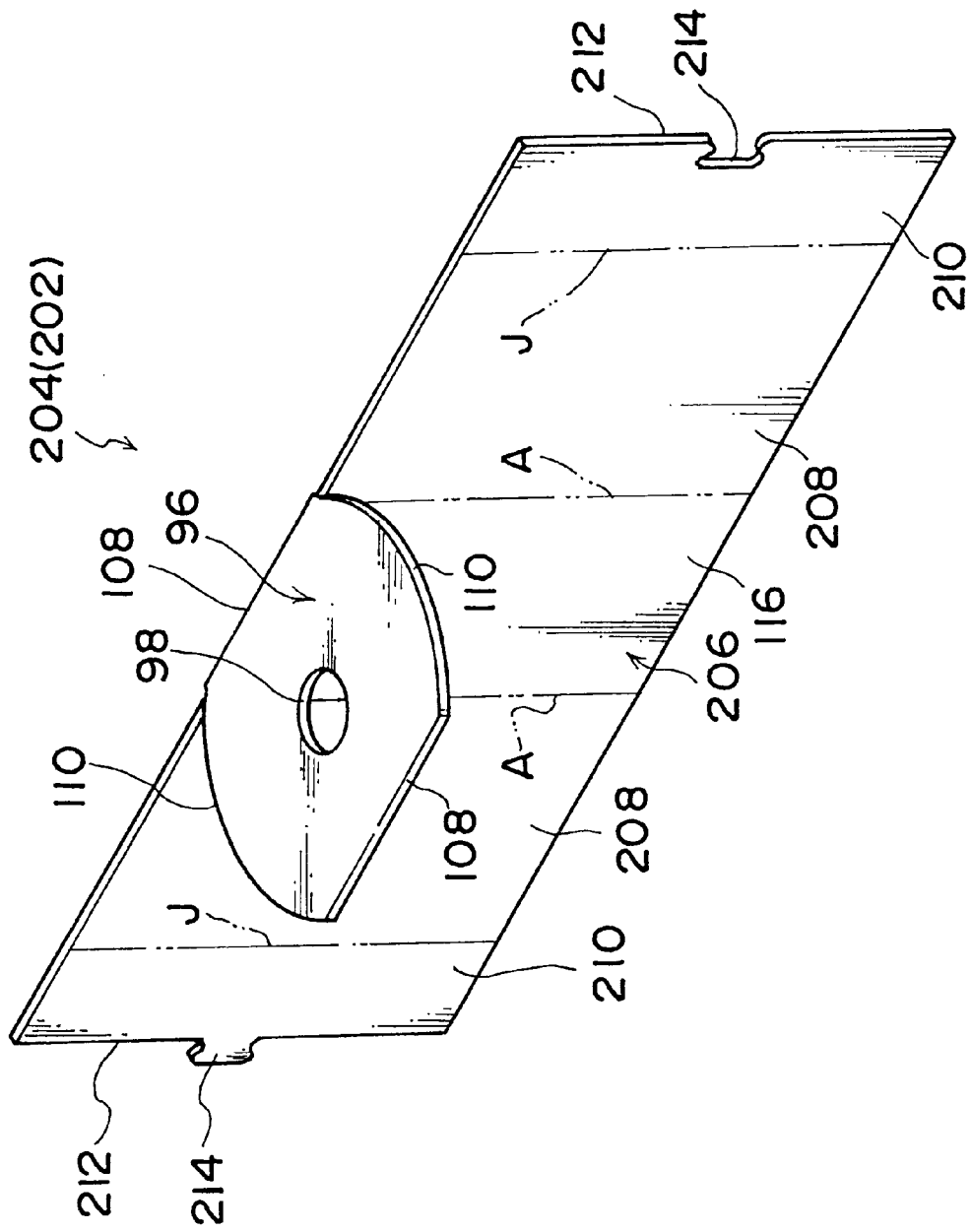
FIG. 16 is a perspective view corresponding to FIG. 15, with a side wall portion being bent.

In this embodiment, first, the base plate 204 shown in FIGS. 14 and 15 is formed by cutting out from one sheet of metal plate in the press process and the rotating-shaft insertion hole 98 is formed at the center of the bottom portion 96. Next, the cut-out base plate 204 is subjected to the bending process such as dies bending. In this bending process, the base plate 204 is bent at the bend region 112 until the side surface of the side wall portion 206 is made perpendicular to the end surface of the bottom portion 96 as shown in FIG. 16 (i.e., until the side surface of the side wall portion 206 is made parallel to the axial direction of the rotating-shaft insertion hole 98). Further, the side wall portion 206 is bent at the positions indicated by the two dot-chain lines in FIGS. 14 to 16, which the positions are the border lines of the flat plate portion 116 and the magnet mounting portions 208, and the magnet mounting portions 208 are curved along the circular arc portions 110, respectively. As a result, the side wall portion 206 has a concave configuration with the magnet mounting portions 208 facing each other. In this state, the side wall portion 206 is further bent at the positions indicated by the two dot-chain lines J in FIGS. 14 to 16, which the positions are the border lines between the magnet mounting portions 208 and the flat plate portions 210 until the flat plate portions 210 are each made parallel to the flat plate portion 116. As a result, respective abutting portions 212 of the flat plate portions 210 contact each other and the yoke 202 is substantially formed into a cylinder similar to the yoke 92 of the first embodiment. Moreover, in this state, the base plate 204 is subjected to connecting processing and the concave portion 214 formed in the abutting portion 212 of one flat plate portion 210 is engaged with the convex portion 216 formed in the abutting portion 212 of another flat plate portion 210 (see FIG. 17). The yoke 202 is thus formed.

The yoke 202 of this embodiment is also formed by the press process and the bending process basically in the same manner as in the yoke 92 of the above-described first embodiment, and therefore, a high positional accuracy of the rotating-shaft insertion hole 98 with respect to the side wall portion 206 can be maintained.

Next, a fourth embodiment of the present invention will be described.

Figure 18:
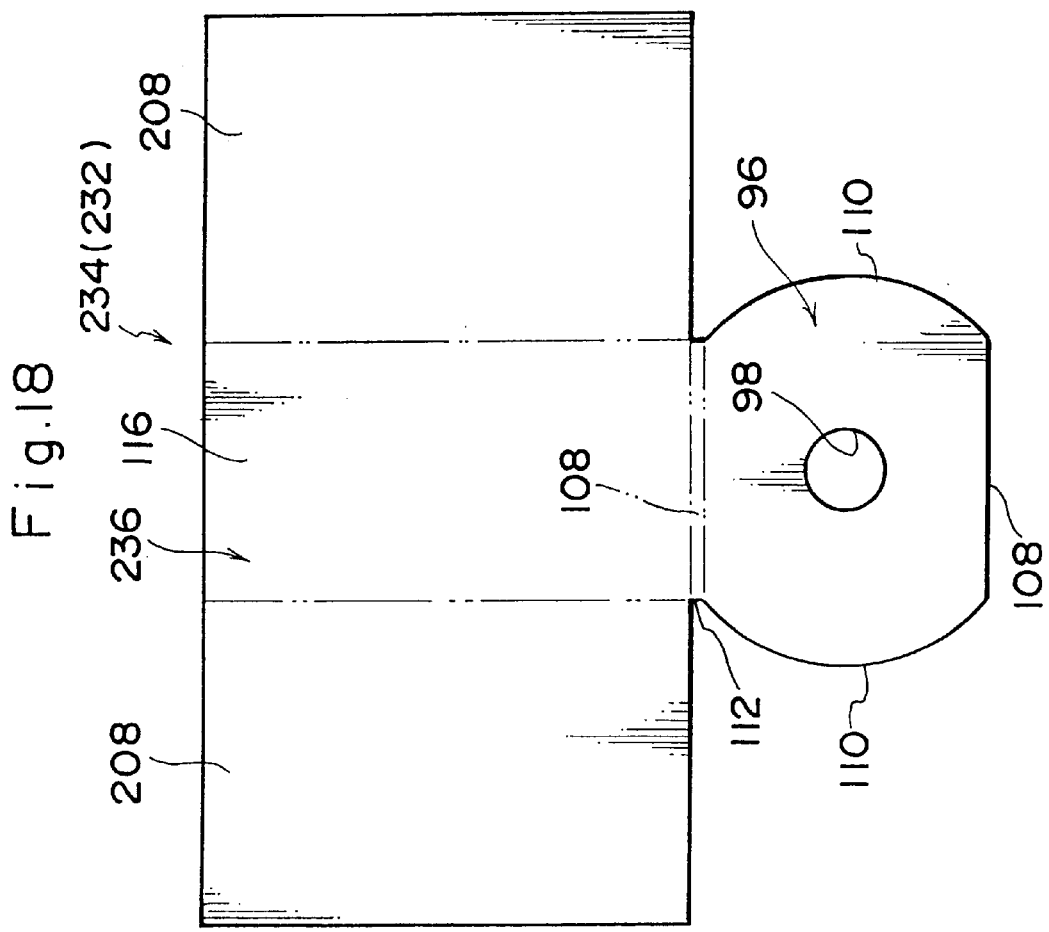
FIG. 18 is a development diagram of a yoke of a motor according to a fourth embodiment of the present invention, i.e., a plan view of a base plate.
Figure 19:
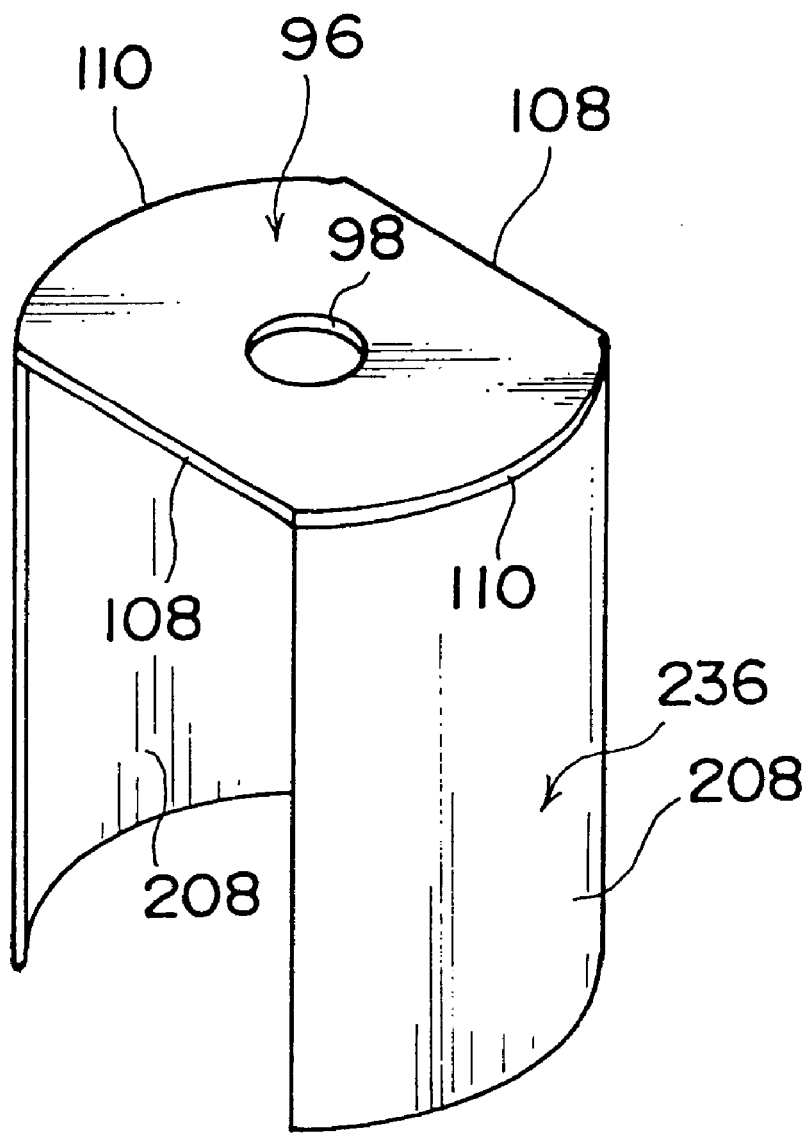
FIG. 19 is a perspective view of the yoke of the motor according to the fourth embodiment of the present invention.

FIG. 18 shows a development view of a yoke 232 of a motor according to the fourth embodiment of the present invention (i.e., a plan view of a base plate 234). FIG. 19 shows a perspective view of the yoke 232. As shown in these drawings, although the flat plate portion 116 corresponding to one of the straight line portions 108 of the bottom portion 96 is formed in a side wall portion 236 of the yoke 232 of this embodiment, no flat plate portion 116 corresponding to another straight line portion 108 is formed.

Namely, the base plate 234 can basically maintain the function as the yoke 232 with no provision of one of the flat plate portions 116 (in other words, the magnet mounting portion 208 is an essential element in consideration of the basic function of the yoke 232, but the flat plate portion 116 is not necessarily required in consideration of the basic function of the yoke 232). Accordingly, as shown in FIGS. 18 and 19, no formation of the flat plate portion 116 corresponding to the other straight line portion 108 allows reduction in the number of processes for bending and also allows reduction in cost.

Meanwhile, the fourth embodiment is constructed such that the flat plate portion 116 corresponding to the other straight line portion 108 is not formed, and therefore, as compared with the side wall portions 114, 176, and 206 of the yokes 92, 172, and 202 shown in the above-described first, second, and third embodiments, a cross-sectional area of the side wall portion 236 in the direction perpendicular to the axial direction of the rotating-shaft insertion hole 98 decreases. As a result, there is a possibility that an amount of passing magnetic flux for a unit cross-sectional area increase as compared with each case of the side wall portions 114, 176, and 206. Accordingly, it is preferable that the plate thickness of the side wall portion 236 be made larger by an amount of the plate thickness of the flat plate portion 116 corresponding to the other straight line portion 108, which is not formed in this embodiment.

Further, in each of the above-described embodiments, the present invention is applied to the washer motor 10 which allows a washer liquid of the washer tank 14 to be attracted by suction and transferred to the washer nozzle 48 and to be further ejected therefrom. However, the present invention can also be applied to any general motor which requires a yoke, which are motors other than the above washer motor 10, for example, motors applied to devices other than vehicles, such as an electric mirror which allows change of the position of a mirror due to driving force of a motor, an air conditioner including a cooler, a heater, and a dehumidifier, and motors used by acoustic products.

What is claimed is:

1. A motor comprising:

a rotor;

a rotatable rotor shaft;

magnets;

a yoke which forms a part of a magnetic circuit and is formed from a single plate, the yoke comprising:
    a bottom portion having a hole in which an elastically deformable holding portion for holding a bearing member which supports said rotatable rotor shaft is provided, said bearing member being rotatable around an axis; and
    a side wall portion which extends integrally from a portion of said bottom portion, and which is bent substantially perpendicular with respect to the bottom portion, and at least a portion of said side wall portion bent along a concentric circle with respect to the hole and holding the magnets at an inner side of the side wall portion, and having a uniform thickness along an axial direction of the rotatable rotor shaft; and a cylindrical case comprising:
    a holding chamber which holds an outer peripheral surface of the side wall portion of the yoke;
    a liquid pressure generating chamber;
    an inner wall which partitions said liquid pressure generating chamber and has a hole through which the rotatable rotor shaft passes; and
    an impeller located within the liquid pressure generating chamber and mounted to the rotor rotating shaft.

2. A motor according to claim 1, further comprising a connecting mechanism which is provided at both end portions of the side wall portion in a circumferential direction of the rotating-shaft insertion hole and fittingly connects said end portions together.

3. A motor according to claim 1, further comprising a pair of magnets which are disposed to face each other within said side wall portion and on said concentric circle with the rotating-shaft insertion hole as the center.

4. A motor according to claim 1, wherein said side wall portion includes two side wall portions which extend symmetrically from the outer peripheral end portion of said bottom portion in a circumferential direction of the rotating-shaft insertion hole.

5. A motor according to claim 4, wherein said magnets include a pair of magnets disposed to face each other within and along the two side wall portions; each one of said pair of magnets having a central portion along an outer surface that substantially coincides with and abuts against an inner side of one of said two side wall portions in a circumferentially direction of the rotating-shaft insertion hole.

6. A motor according to claim 5, wherein a base plate comprising a portion of each of the two side wall portions at which one of said pair of magnets is mounted is not integral with the bottom portion, and another portion of one of the two side wall portions at which the magnet is not mounted is integral with the bottom portion.

7. A motor according to claim 1, wherein the outer peripheral end portion of said bottom portion includes:

straight line portions disposed parallel to each other with the rotating-shaft insertion hole interposed therebetween; and circular arc portions which face each other with the rotating-shaft insertion hole interposed therebetween, said circular arc portions being connected to respective one ends of said straight line portions and respective another ends of said straight line portions and being curved along said concentric circle with the rotating-shaft insertion hole as the center.

8. A motor according to claim 7, wherein said side wall portion includes:

a pair of flat plate portions respectively connected to the straight line portions of said bottom portion; and magnet mounting portions formed for each of the flat plate portions so as to correspond to said circular arc portions and curved along the circular arc portions, the magnets being mounted along inner peripheral portions of said magnet mounting portions.

9. A motor according to claim 8, wherein said side wall portion includes two side wall portions which respectively extend from the pair of straight line portions, and each of the two side wall portions is connected at lateral sides to a pair of magnet mounting portions, an abutting portion of said magnet mounting portion is disposed at an opposite side with respect to the flat plate portion and abuts against an end portion of a magnet mounting portion of another of the two side wall portions, and said another of the two side wall portions is disposed at an opposite side with respect to the flat plate portion.

10. A motor according to claim 9, wherein the magnets are disposed along both the magnet mounting portion of said one of the side wall portions and the magnet mounting portion of said another side wall portion.

11. A motor comprising:

a rotor;

a rotatable rotor shaft;

magnets;

a yoke which forms a part of a magnetic circuit and is formed from a single plate, the yoke comprising:

a bottom portion having a hole through which said rotatable rotor shaft passes; and a single side wall portion projecting integrally from a portion of an outer periphery of the bottom portion in a direction tangent to the bottom portion, a portion of the side wall portion which is connected to the bottom portion being bent substantially perpendicular with respect to the bottom portion, the side wall portion being bent coaxially with respect to the hole, the side wall portion having a magnet mounting portion at an inner side of the side wall portion, and the side wall portion having a uniform thickness along an axial direction of the rotor rotating shaft; and a cylindrical case comprising:

a holding chamber which holds an outer peripheral surface of the side wall portion of the yoke;

a liquid pressure generating chamber:

an inner wall which partitions said liquid pressure generating chamber and has a hole through which the rotatable rotor shaft passes; and an impeller located within the liquid pressure generating chamber and mounted to the rotatable rotor shaft.

12. A motor according to claim 11, further comprising a connecting mechanism which is formed by a concave portion formed at one end of said side wall portion including the magnet placing portions in a circumferential direction of the rotating-shaft insertion hole and a convex portion formed at another end of said side wall portion so as to be engageable with the concave portion, the connecting mechanism allowing connection of the both ends of said side wall portion with the convex portion being engaged with the concave portion.

13. A motor according to claim 11, wherein a pair of end portions of said side wall portion connect to each other, with said bottom portion as a center, along an outer peripheral end of said bottom portion where said side wall portion is not integral with said bottom portion.

14. A motor according to claim 11, wherein said side wall portion includes two side wall portions which extend symmetrically from an outer peripheral end portion of said bottom portion and a base plate comprising a portion of each one of said two side wall portions at which the magnet is mounted is not integral with said bottom portion, and another portion of each one of the two side wall portions at which the magnet is not mounted is integral with said bottom portion.

15. A motor comprising:

a rotor;

a rotatable rotor shaft;

magnets;

a yoke which forms a part of a magnetic circuit and is formed from a single plate, the yoke comprising:

a bottom portion having a hole in which an elastically deformable holding portion for holding a bearing member which supports said rotatable rotor shaft is provided, said bearing member being rotatable around an axis; and a side wall portion formed from a flat-plate portion extending integrally in a direction perpendicular to the parallel portions and bent substantially perpendicular at the parallel portions, and a magnet mounting portion connected only to the flat-plate portion and extending integrally in a direction parallel to the parallel portions and a portion of the magnet mounting portion not connected to the parallel portions is bent along a concentric circle with respect to the hole; and a cylindrical case comprising:

a holding chamber for holding the yoke;

a liquid pressure generating chamber;

an inner wall which partitions said liquid pressure generating chamber and has a hole through which the rotatable rotor shaft passes; and an impeller disposed within the liquid pressure generating chamber and mounted to the rotatable rotor shaft.

16. A motor comprising:

a rotor;

a rotatable rotor shaft;

magnets;

a yoke which forms a part of a magnetic circuit and is formed from a single plate, the yoke comprising:

a bottom portion having a hole in which an elastically deformable holding portion for holding a bearing member which supports said rotatable rotor shaft is provided, said bearing member being rotatable around an axis; and a side wall portion formed from a flat-plate portion which extends integrally in a direction perpendicular to the parallel portions and is bent substantially perpendicular at the parallel portions, and a magnet mounting portion connected only to the flat-plate portion and extending integrally in a direction parallel to the parallel portions and a portion of the magnet mounting portion not connected to the parallel portions is bent along a concentric circle with respect to the hole.

\* \* \* \* \*